US008011472B2

(12) United States Patent
Tanase et al.

(10) Patent No.: US 8,011,472 B2
(45) Date of Patent: Sep. 6, 2011

(54) SOUND ABSORBING STRUCTURE AND VEHICLE COMPONENT HAVING SOUND ABSORBING PROPERTY

(75) Inventors: Rento Tanase, Iwata (JP); Yasutaka Nakamura, Hamamatsu (JP); Atsushi Yoshida, Hamamatsu (JP); Masaru Matsushita, Hamamatsu (JP); Kunio Hiyama, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 12/361,101

(22) Filed: Jan. 28, 2009

(65) Prior Publication Data

US 2009/0205901 A1 Aug. 20, 2009

(30) Foreign Application Priority Data

| | | | |
|---|---|---|---|
| Feb. 1, 2008 | (JP) | ................................ | 2008-022558 |
| Mar. 5, 2008 | (JP) | ................................ | 2008-055367 |
| Mar. 18, 2008 | (JP) | ................................ | 2008-069794 |
| Mar. 18, 2008 | (JP) | ................................ | 2008-069795 |
| Apr. 14, 2008 | (JP) | ................................ | 2008-104965 |
| Apr. 22, 2008 | (JP) | ................................ | 2008-111481 |
| Aug. 28, 2008 | (JP) | ................................ | 2008-219129 |
| Aug. 29, 2008 | (JP) | ................................ | 2008-221316 |
| Sep. 1, 2008 | (JP) | ................................ | 2008-223442 |

(51) Int. Cl.
*E04B 1/82* (2006.01)
*F16F 7/00* (2006.01)
*B06B 1/06* (2006.01)

(52) U.S. Cl. ........ 181/286; 181/207; 181/284; 181/290; 367/176

(58) Field of Classification Search .................. 181/286, 181/284, 290, 198, 175, 151, 207; 367/176
See application file for complete search history.

(56) References Cited

U.S. PATENT DOCUMENTS 2,185,023 A 12/1939 Crane
(Continued)

FOREIGN PATENT DOCUMENTS

CN 2272469 Y 1/1998
(Continued)

OTHER PUBLICATIONS

Sho Kimura; "Architerctural Acoustics and Noise Insulation Plans"; Shokokokusha Kabushiki Kaisha, Feb. 20, 1981, pp. 150-151, (English translation attached).

(Continued)

*Primary Examiner* — Elvin G Enad
*Assistant Examiner* — Christina Russell
(74) *Attorney, Agent, or Firm* — Dickstein Shapiro LLP

(57) ABSTRACT

A sound absorbing structure is constituted of a housing having a hollow portion and an opening and a vibration member composed of a board or diaphragm. The vibration member is a square-shaped material having elasticity composed of a synthetic resin and is bonded to the opening of the housing, thus forming an air layer closed inside the sound absorbing structure by the housing and the vibration member. In the sound absorbing structure, when the lateral/longitudinal dimensions of the air layer and characteristics of the vibration member (e.g. a Young's modulus, thickness, and Poisson's ratio) are set such that the fundamental frequency of a vibration occurring in a bending system falls within 5% and 65% of the resonance frequency of a spring-mass system, a vibration mode having a large amplitude occurs in a frequency band lower than the resonance frequency of the spring-mass system, this improving the sound absorption coefficient.

10 Claims, 25 Drawing Sheets

U.S. PATENT DOCUMENTS

| | | | | |
|---|---|---|---|---|
| 2,541,159 | A | 2/1951 | Geiger | |
| 2,796,636 | A | 6/1957 | Heerwagen | |
| 3,851,724 | A | 12/1974 | Banks, Jr. | |
| 3,876,034 | A | 4/1975 | Antonini | |
| 4,130,175 | A | 12/1978 | Hehmann | |
| 4,177,876 | A | 12/1979 | Pujolle | |
| 4,371,858 | A | 2/1983 | Kanoi et al. | |
| 4,373,608 | A | 2/1983 | Holmes | |
| 4,442,419 | A | 4/1984 | Kanoi et al. | |
| 4,538,697 | A * | 9/1985 | Muroi et al. | 180/68.4 |
| 4,558,296 | A | 12/1985 | Thoren | |
| 4,782,913 | A | 11/1988 | Hoffmann et al. | |
| 4,815,050 | A * | 3/1989 | Kurz | 367/176 |
| 4,850,163 | A | 7/1989 | Kobayashi et al. | |
| 5,042,569 | A | 8/1991 | Siegmund | |
| 5,138,588 | A * | 8/1992 | Chuan et al. | 367/176 |
| 5,210,720 | A * | 5/1993 | Caprette et al. | 367/176 |
| 5,501,754 | A | 3/1996 | Hiraguri | |
| 5,521,341 | A | 5/1996 | Stief et al. | |
| 5,587,564 | A | 12/1996 | Stief et al. | |
| 5,740,649 | A * | 4/1998 | Fuchs et al. | 52/506.06 |
| 5,905,234 | A * | 5/1999 | Tsukamoto et al. | 181/286 |
| 5,975,238 | A * | 11/1999 | Fuchs et al. | 181/295 |
| 6,021,612 | A * | 2/2000 | Dunn et al. | 52/144 |
| 6,101,768 | A | 8/2000 | Springstead et al. | |
| 6,167,985 | B1 * | 1/2001 | Van Ligten | 181/286 |
| 6,290,022 | B1 | 9/2001 | Wolf et al. | |
| 6,463,704 | B1 | 10/2002 | Jette | |
| 6,478,110 | B1 | 11/2002 | Eatwell et al. | |
| 6,525,931 | B2 | 2/2003 | Yagenji et al. | |
| 6,568,135 | B1 * | 5/2003 | Yokoyama et al. | 52/145 |
| 6,638,640 | B2 | 10/2003 | Jee | |
| 6,739,425 | B1 | 5/2004 | Griffin et al. | |
| 6,789,645 | B1 * | 9/2004 | Deblander | 181/290 |
| 6,988,057 | B2 | 1/2006 | Huang et al. | |
| 7,267,196 | B2 | 9/2007 | Mathur | |
| 7,395,898 | B2 | 7/2008 | Yang et al. | |
| 7,454,869 | B2 | 11/2008 | Owen | |
| 7,520,096 | B2 | 4/2009 | Hiraguri et al. | |
| 7,540,353 | B2 * | 6/2009 | Okawa et al. | 181/250 |
| 2003/0167710 | A1 | 9/2003 | Tanase et al. | |
| 2004/0055813 | A1 * | 3/2004 | Tsuiki et al. | 181/204 |
| 2005/0051381 | A1 * | 3/2005 | Imai | 181/207 |
| 2005/0098379 | A1 * | 5/2005 | Sato et al. | 181/293 |
| 2005/0155815 | A1 * | 7/2005 | Sasaki et al. | 181/151 |
| 2005/0189165 | A1 * | 9/2005 | Mathur | 181/207 |
| 2005/0194209 | A1 | 9/2005 | Yang et al. | |
| 2007/0017739 | A1 | 1/2007 | Yamagiwa et al. | |
| 2007/0140518 | A1 | 6/2007 | Larsen | |
| 2007/0151796 | A1 | 7/2007 | Heid | |
| 2007/0284185 | A1 | 12/2007 | Foss | |
| 2008/0093164 | A1 * | 4/2008 | Hiyama et al. | 181/288 |
| 2008/0128200 | A1 | 6/2008 | Tsugihashi et al. | |
| 2008/0128202 | A1 | 6/2008 | Palumbo et al. | |
| 2008/0135327 | A1 | 6/2008 | Matsumura et al. | |
| 2009/0084627 | A1 * | 4/2009 | Tsugihashi et al. | 181/290 |
| 2009/0120717 | A1 * | 5/2009 | Tanase | 181/284 |
| 2009/0201102 | A1 | 8/2009 | Oda | |
| 2009/0205901 | A1 | 8/2009 | Tanase et al. | |
| 2010/0044148 | A1 | 2/2010 | Tanase | |
| 2010/0089691 | A1 * | 4/2010 | Nakamura et al. | 181/286 |

FOREIGN PATENT DOCUMENTS

| | | | |
|---|---|---|---|
| JP | 5-231177 | A | 9/1993 |
| JP | 06-083365 | A | 3/1994 |
| JP | 2006-011412 | A | 1/2006 |
| JP | 2009167701 | A | 7/2009 |
| JP | 2009255908 | A | 11/2009 |
| JP | 2009288355 | A | 12/2009 |
| JP | 2009293252 | A | 12/2009 |
| JP | 2009293271 | A | 12/2009 |

OTHER PUBLICATIONS

Yoichi Kobori; "Practical Vibration Calculation Method"; Publisher: Kougaku-Tosho Kabushiki Kaisha, Version 6, pp. 213.

JIS A 1405-2; "Acoustics—Determination of sound absorption coefficient and impedance in impedance tubes—Part 2: Transfer-function method"; Published by Japanese Industrial Standard, Apr. 20, 2007.

JIS A 1409; "Method for measurement of sound absorption coefficients in a reverberation room"; Published by Japanese Industrial Standard, Dec. 20, 2008.

Japanese Industrial Standard: "Acoustics—Determination of sound absorption coefficient and impedance in impedance tubes—Part 2: Transfer-function method", JIS A 1405-2: 2007 (ISO 10534-2: 1998).

* cited by examiner

SOUND ABSORBING STRUCTURE AND VEHICLE COMPONENT HAVING SOUND ABSORBING PROPERTY

BACKGROUND OF THE INVENTION

1. Field of the Invention

The present invention relates to sound absorbing structures adapted to sound chambers, and in particular to vehicle components having sound absorbing properties.

The present application claims priority on Japanese Patent Application No. 2008-22558, Japanese Patent Application No. 2008-55367, Japanese Patent Application No. 2008-69794, Japanese Patent Application No. 2008-104965, Japanese Patent Application No. 2008-69795, Japanese Patent Application No. 2008-111481, Japanese Patent Application No. 2008-223442, Japanese Patent Application No. 2008-221316, and Japanese Patent Application No. 2008-219129, the contents of which are incorporated herein by reference in their entirety.

2. Description of the Related Art

Conventionally, various sound absorbing structures have been developed and disclosed in various documents such as Patent Document 1 and Non-Patent Document 1.

Patent Document 1: Japanese Unexamined Patent Application Publication No. 2006-11412

Non-Patent Document 1: "Architectural Acoustics and Noise Insulation Plans" written by Sho Kimura, Shokokusha Kabushiki Kaisha, Feb. 20, 1981, p.p. 150-151

Patent Document 1 teaches a sound absorbing structure which absorbs sound by a plate-shaped or diaphragm-shaped vibration member and an air layer lying in the space behind the vibration member (hereinafter, referred to as a plate/diaphragm vibration sound absorbing structure). In the plate/diaphragm-vibration sound absorbing structure, a spring-mass system is composed of a mass of a vibration member and a spring component of an air layer. The spring-mass system has a resonance frequency f [Hz], which is expressed using an air density $\rho_0$ [kg/m$^3$], a sound speed $c_0$ [m/s], a density $\rho$ [kg/m$^3$] of the vibration member, a thickness t [m] of the vibration member, and a thickness L [m] of the air layer in accordance with equation (1).

$$f = \frac{1}{2\pi}\left\{\frac{\rho_0 c_0^2}{\rho t L}\right\}^{1/2} \quad (1)$$

When the vibration member of the plate/diaphragm-vibration sound absorbing structure has an elasticity so as to cause an elastic vibration, the property of a bending system is additionally introduced due to the elastic vibration. Non-Patent Document 1 teaches a sound absorbing structure based on architectural acoustics, wherein the resonance frequency of the plate/diaphragm-vibration sound absorbing structure is calculated using a first-side length a [m] of the vibration member having a rectangular shape, an second-side length b [m], a Young's modulus E [N/m$^2$] of the vibration member, and a Poisson's ratio $\sigma$ [–] of the vibration member, and integral numbers p and q in accordance with an equation (2) and is used for acoustic design.

$$f = \frac{1}{2\pi}\left\{\frac{\rho_0 c_0^2}{\rho t L} + \left[\left(\frac{p}{a}\right)^2 + \left(\frac{q}{b}\right)^2\right]^2\left[\frac{\pi^4 E t^3}{12\rho t(1-\sigma^2)}\right]\right\}^{1/2} \quad (2)$$

In equation (2), the term ($\rho_0 c_0^2/\rho tL$) of the spring-mass system is added to the term of the bending system (subsequent to the term of the spring-mass system); hence, the resonance frequency becomes higher than the resonance frequency of the spring-mass system, which in turn makes it difficult to reduce the peak frequency of sound absorption.

The relationship between the resonance frequency of the spring-mass system and the resonance frequency of the bending system due to elastic vibration caused by the elasticity of a plate has not been sufficiently resolved; hence, it is not possible to achieve high sound absorption in low frequencies in the plate/diaphragm-vibration sound absorbing structure.

SUMMARY OF THE INVENTION

It is an object of the present invention to provide a sound absorbing structure which efficiently absorbs sound by lowering peak frequencies of sound absorption in a plate/diaphragm-vibration sound absorbing structure.

In one embodiment of the present invention, a sound absorbing structure is constituted of a hollow housing having an opening and a vibration member composed of a plate or diaphragm, wherein the opening is closed by the vibration member and wherein a peak frequency of sound absorption, which occurs in relation to the fundamental vibration of an elastic vibration of the vibration member and a spring component of an air layer in a hollow portion of the housing, is lower than the resonance frequency of a spring-mass system composed of the mass of the vibration member and the spring component of the air layer in the hollow portion of the housing.

It is preferable that the fundamental frequency of the elastic vibration of the vibration member falls within a range of 5% to 65% of the resonance frequency of the spring-mass system composed of the mass of the vibration member and the spring component of the hollow portion of the housing. The vibration member can be fixed to and supported by the housing.

In the constitution in which a part of the vibration member placed in contact with the housing is fixed in position and in which the hollow portion of the housing has a rectangular parallelepiped shape and the opening has a square shape, it is preferable to satisfy an equation (3) using a first-side length a [m] of the square shape, a Young's modulus E [N/m$^2$] of the vibration member, a thickness t [m] of the vibration member, a Poisson's ratio $\sigma$ of the vibration member, and a thickness L [m] of the hollow portion.

$$3 < \left(\frac{1}{a}\right)^4 \frac{Et_3L}{(1-\sigma^2)} < 550 \quad (3)$$

In the constitution in which the hollow portion of the housing has a rectangular parallelepiped shape and the opening has a rectangular shape, it is preferable to satisfy an equation (4) using a first-side length a [m] of the rectangular shape, a second-side length b [m] perpendicular to the side of the length "a" in the rectangular shape, a Young's modulus E [N/m$^2$] of the vibration member, a thickness t [m] of the vibration member, a Poisson's ratio $\sigma$ of the vibration member, and a thickness L [m] of the hollow portion.

$$12<\left[\left(\frac{1}{a}\right)^2+\left(\frac{1}{b}\right)^2\right]^2\left[\frac{Et^3L}{(1-\sigma^2)}\right]<2100 \quad (4)$$

In the constitution in which the hollow portion of the housing has a cylindrical shape and the opening has a circular shape, it is preferable to satisfy equation (5) using a radius R [m] of the opening as well as the Young's modulus E [N/m$^2$] of the vibration member, the thickness t [m] of the vibration member, the Poisson's ratio σ of the vibration member, and the thickness L [m] of the hollow portion.

$$40<\left[\left(\frac{1}{R}\right)^2\right]^2\frac{Et^3L}{(1-\sigma^2)}<6850 \quad (5)$$

In this connection, the vibration member can be simply supported by the housing.

In the constitution in which the vibration member is supported by the housing such that the displacement thereof is limited and in which the hollow portion of the housing has a rectangular parallelepiped shape and the opening has a square shape, it is preferable to satisfy equation (6) using the first-side length a [m] of the square shape, the Young's modulus E of the vibration member, the thickness t of the vibration member, the Poisson's ratio a of the vibration member, and the thickness L of the hollow portion.

$$10<\left(\frac{1}{a}\right)^4\frac{Et^3L}{(1-\sigma^2)}<1820 \quad (6)$$

In the constitution in which the hollow portion of the housing has a rectangular parallelepiped shape and the opening has a rectangular shape, it is preferable to satisfy equation (7) using the first-side length a [m] of the rectangular shape, the second-side length b [m] perpendicular to the side of the length "a" in the rectangular shape, the Young's modulus E [N/m$^2$] of the vibration member, the thickness t [m] of the vibration member, the Poisson's ratio σ of the vibration member, and the thickness L [m] of the hollow portion.

$$40<\left[\left(\frac{1}{a}\right)^2+\left(\frac{1}{b}\right)^2\right]^2\left[\frac{Et^3L}{(1-\sigma^2)}\right]<7300 \quad (7)$$

In the constitution in which the hollow portion of the housing has a cylindrical shape and the opening has a circular shape, it is preferable to satisfy equation (8) using the radius R [m] of the opening, the Young's modulus E [N/m$^2$] of the vibration member, the thickness t [m] of the vibration member, the Poisson's ratio σ of the vibration member, and the thickness L [m] of the hollow portion.

$$161<\left[\left(\frac{1}{R}\right)^2\right]^2\frac{Et^3L}{(1-\sigma^2)}<27700 \quad (8)$$

DESCRIPTION OF THE PREFERRED EMBODIMENTS

1. First Embodiment

(A) Sound Absorbing Structure

A sound absorbing structure according to a first embodiment of the present invention will be described with reference to FIGS. 1 to 6.

Figure 1:
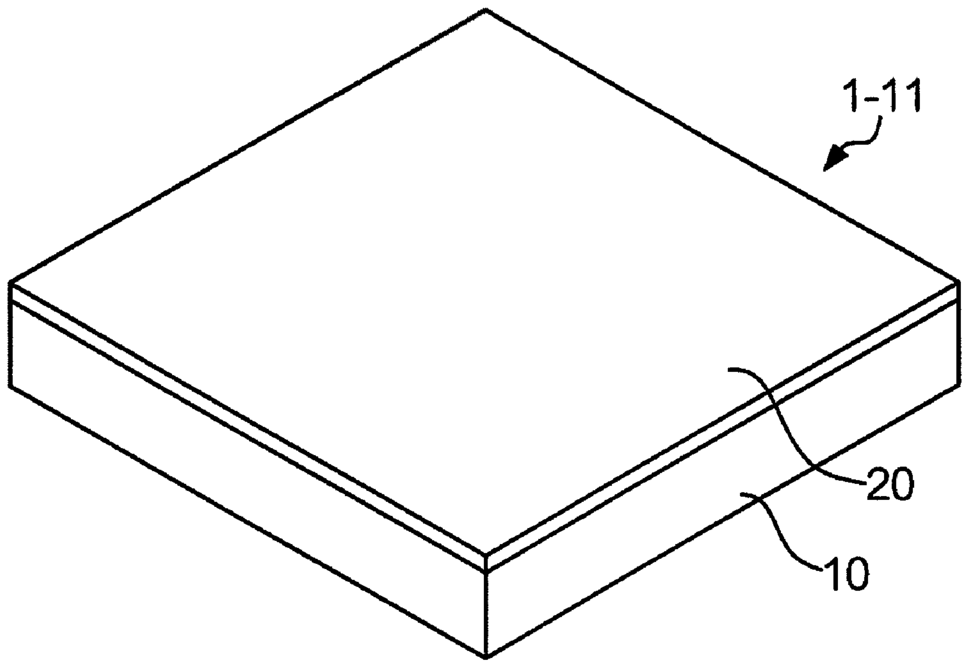
FIG. 1 is a perspective view showing the external appearance of a sound absorbing structure in accordance with a first embodiment of the present invention.
Figure 2:
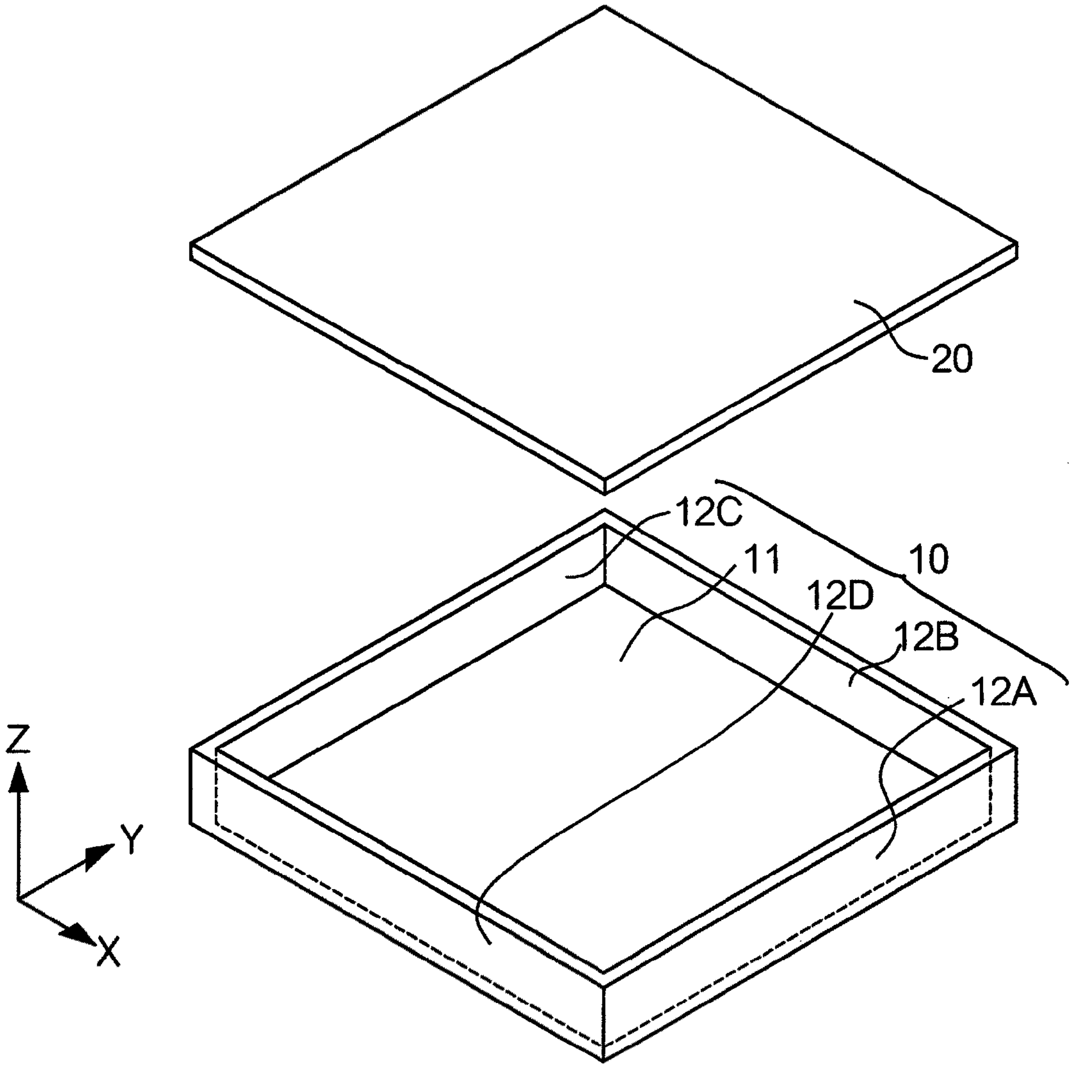
FIG. 2 is an exploded perspective view of the sound absorbing structure.

FIG. 1 is an exterior view of a sound absorbing structure 1-11; and FIG. 2 is an exploded perspective view of a basic portion of the sound absorbing structure 1-11. In order to illustrate the constitution of the present embodiment in an easy-to-understand manner, dimensions of the sound absorbing structure 1-11 do not precisely match actual dimensions thereof.

The sound absorbing structure 1-11 is constituted of a housing 10 and a vibration member 20. The housing 10 composed of a synthetic resin is shaped in a hollow square column whose end is opened while the opposite end is closed, wherein it is constituted of a bottom portion 11 forming the bottom thereof and side walls 12A to 12D.

The vibration member 20 is a square-shaped member which is produced by shaping a synthetic resin having elasticity in a plate shape, wherein it is bonded to the opening of the housing 10. The vibration member 20 is bonded and fixed to the opening of the housing 10 so as to form an air layer which is closed in the inside of the sound absorbing structure 1-11 (or in the backside of the vibration member 20). In the present embodiment, the material of the vibration member 20 is a synthetic resin; but this is not a restriction. It is possible to employ other materials having elasticity and causing elastic vibration such as papers, metals, and fiber boards. The vibration member 20 is not necessarily shaped as a plate but can be shaped as a membrane. The vibration member 20 is deformed by applying a force thereto and is then is restored so as to vibrate due to elasticity. The plate shape indicates the two-dimensionally expanded shape whose thickness is smaller in comparison with a three-dimensional rectangular parallelepiped shape. The membrane shape (e.g. a film shape and a sheet shape) is further reduced in thickness compared to the plate shape and indicates the shape which can be restored due to tension. The vibration member 20 has a relatively low rigidity (i.e. a low Young's modulus, a small thickness, and a small secondary sectional moment) or a relatively low mechanical impedance, which is expressed as "$8\times\{(\text{bending rigidity})\text{x}(\text{surface density})\}^{1/2}$", compared to the housing 10; hence, the vibration member 20 demonstrates a sound absorbing function on the housing 10.

In the sound absorbing structure 1-11 having the above basic constitution, a partition board 30 which is formed using the same material as the housing 10 is arranged in the air layer so as to partition the air layer into plural sections (hereinafter, each partitioned space will be referred to as a cell).

Figure 3:
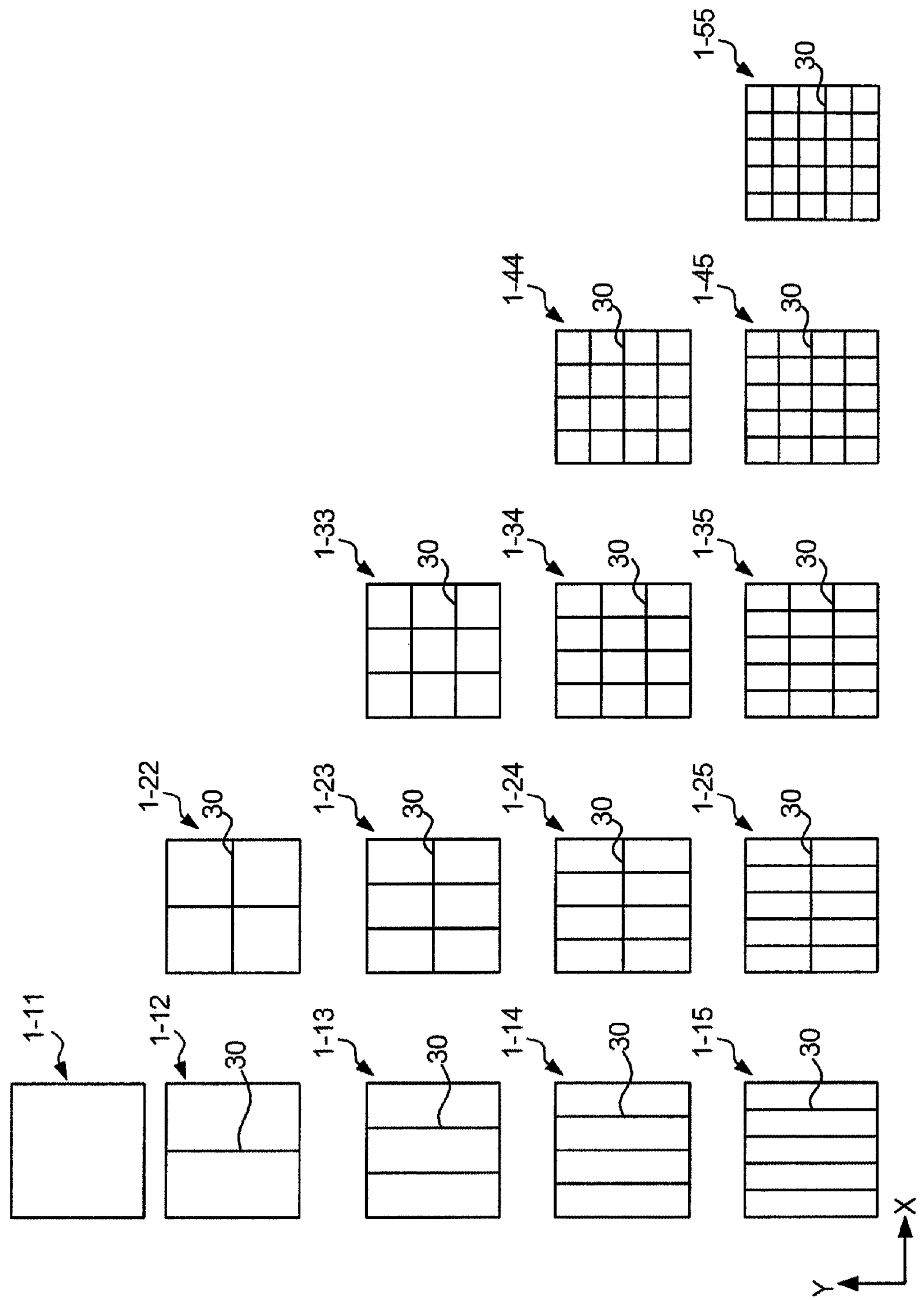
FIG. 3 is a plan view showing the sound absorbing structure of FIG. 1 and various sound absorbing structures whose air layers are partitioned by partition boards.
Figure 4:
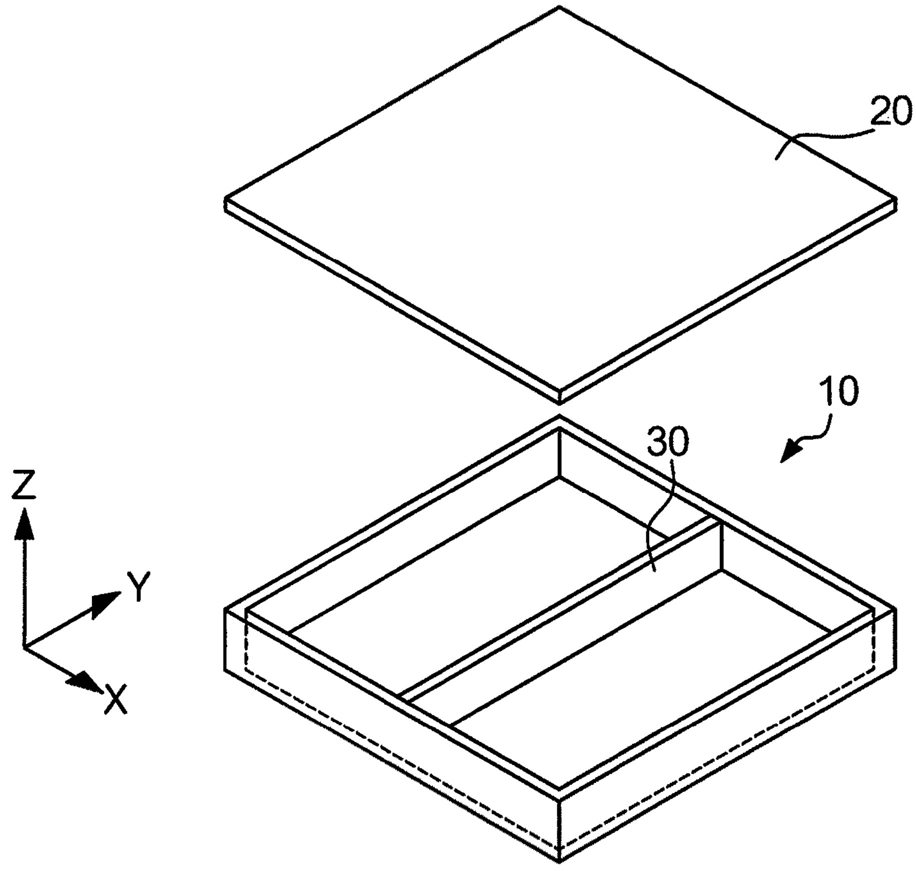
FIG. 4 is an exploded perspective view showing a sound absorbing structure whose air layer is partitioned into two sections by a partition board.
Figure 5:
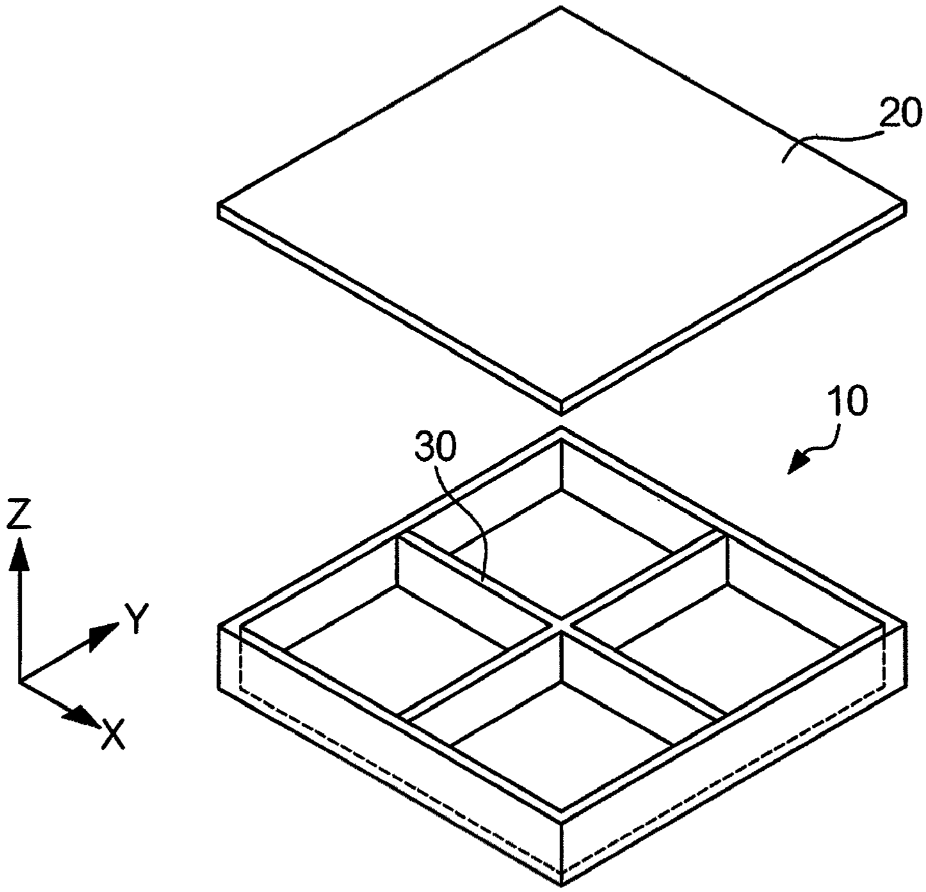
FIG. 5 is an exploded perspective view showing a sound absorbing structure whose air layer is partitioned into four sections by partition boards.

FIG. 3 shows the sound absorption structure 1-11 from which the vibration member 20 is removed as well as sound absorbing structures 1-12 to 1-15, 1-22 to 1-25, 1-33 to 1-35, 1-44 to 1-45, and 1-55, the basic constitutions of which are identical to the basic constitution of the sound absorbing structure 1-11, the air layers of which are partitioned by the partition board 30, and from which the vibration members 20 are removed.

In each of the sound absorbing structures 1-12 to 1-15, the partition board 30 is formed into a rectangular plate-like shape. In the sound absorbing structure 1-12 shown in FIG. 4, the Y-direction length of the partition board 30 is identical to the distance between the side walls 12B and 12D, while the height of the partition board 30 is identical to the height measured between the upper ends of the side walls 12A to 12D and the bottom portion 11.

In each of the sound absorbing structures 1-22 to 1-25, 1-33 to 1-35, 1-44 to 1-45, and 1-55, the air layer is partitioned by the partition board 30 unified in a lattice shape. In the sound absorbing structure 1-22 shown in FIG. 5, the Y-direction length of the partition board 30 unified in a lattice shape is identical to the distance between the side wall 12B and the side wall 12D, the X-direction length is identical to the distance between the side wall 12A and 12C, and the height of the partition board 30 is identical to the height measured between the upper ends of the side walls 12A to 12D and the bottom portion 11.

Each of the sound absorbing structures 1-11 to 1-55 has the plate-shaped vibration member 20 and the air layer on the backside of the vibration member 20, thus forming the plate/diaphragm-vibration sound absorbing structure. One end of the partition board 30 in the Z-direction is bonded to the vibration member 20, while the other end is bonded to the bottom portion 11.

In the plate/diaphragm-vibration sound absorbing structure in which the resonance of the spring-mass system does not occur independently of the resonance of the bending system so that the resonance frequencies thereof are close to each other, the resonance of the spring-mass system cooperates with the resonance of the bending system so as to determine the resonance frequency of the sound absorbing structure. When the resonance frequency of the spring-mass system separates from the resonance frequency of the bending system, both resonance frequencies may affect each other but operate independently of each other.

In order to study the above influence, the present inventors performed simulation using numerical analysis with respect to the resonance frequency of the spring-mass system, the resonance frequency of the bending system, and the peak frequency of sound absorption in the sound absorbing structure.

Table 1 shows simulation results on the sound absorbing structures 1-11 to 1-55, and Table 2 shows simulation results on the sound absorbing structures 1-11 to 1-55 by changing lateral and longitudinal lengths of cells. Herein, "a" denotes the lateral length of each cell, "b" denotes the longitudinal length of each cell, L denotes the thickness of the air layer, fb denotes the fundamental frequency of the spring-mass system, fk denotes the fundamental frequency of the bending system, fk/fb denotes the ratio between the fundamental frequency fk of the bending system and the fundamental frequency fb of the spring-mass system, and fp denotes the peak frequency of sound absorption.

TABLE 1

| Sound Absorption Structure | a | b | L | fb | fk | fk/fb (%) | fp |
|---|---|---|---|---|---|---|---|
| 1-11 | 315 | 315 | 30 | 385 | 15 | 4 | 380 |
| 1-12 | 156 | 315 | 30 | 385 | 42 | 11 | 180 |
| 1-22 | 156 | 156 | 30 | 385 | 61 | 16 | 180 |
| 1-13 | 103 | 315 | 30 | 385 | 90 | 23 | 320 |
| 1-23 | 103 | 156 | 30 | 385 | 104 | 27 | 220 |
| 1-33 | 103 | 103 | 30 | 385 | 139 | 36 | 280 |
| 1-14 | 77 | 315 | 30 | 385 | 160 | 42 | 360 |
| 1-24 | 77 | 156 | 30 | 385 | 171 | 45 | 260 |
| 1-34 | 77 | 103 | 30 | 385 | 199 | 52 | 320 |
| 1-44 | 77 | 77 | 30 | 385 | 250 | 65 | 360 |
| 1-15 | 61 | 315 | 30 | 385 | 253 | 66 | 400 |
| 1-25 | 61 | 156 | 30 | 385 | 263 | 68 | 420 |
| 1-35 | 61 | 103 | 30 | 385 | 286 | 74 | 380 |
| 1-45 | 61 | 77 | 30 | 385 | 328 | 85 | 420 |
| 1-55 | 61 | 61 | 30 | 385 | 394 | 102 | 480 |

TABLE 2

| Sound Absorbing Structure | a | b | L | fb | fk | fk/fb (%) | fp |
|---|---|---|---|---|---|---|---|
| (1) | 252 | 336 | 30 | 337 | 10 | 3 | 320 |
| (2) | 168 | 252 | 30 | 337 | 21 | 6 | 200 |
| (3) | 126 | 336 | 30 | 337 | 33 | 10 | 160 |
| (4) | 126 | 168 | 30 | 337 | 40 | 12 | 100 |
| (5) | 112 | 126 | 30 | 337 | 58 | 17 | 160 |
| (6) | 84 | 336 | 30 | 337 | 73 | 22 | 260 |

In the above simulation, a Z-direction thickness L of the air layer (i.e. the distance between the surface of the bottom portion 11 positioned opposite to the vibration member 20 and the backside of the vibration member 20 positioned opposite to the bottom portion 11) is set to 30 [mm], and the lateral length "a" and longitudinal length "b" of each cell in the sound absorbing structure are set to values shown in Table 1 and Table 2. In addition, the density of the vibration member 20 is $\rho$=940 [kg/m$^3$], the Poisson's ratio of the vibration member 20 is $\sigma$=0.4, the thickness of the vibration member is t=0.85 [mm], and the Young's modulus of the vibration member 20 is E=8.8×10$^8$ [N/m$^2$]. In Table 1 and Table 2, the resonance frequency fb of the spring-mass system is calculated by equation (1). The fundamental frequency fk of the bending system is calculated by the second term subsequent to the first term ($\rho_0 c_0^2/\rho t L$) of the spring-mass system in equation (2). In the second term of equation (2), the integral numbers are set as p=1 and q=1 (hereinafter, the resonance frequency of the bending system calculated using p=1 and q=1 will be referred to as the fundamental frequency of the bending system). The peak frequency fp of sound absorption is produced by way of numerical simulation on sound absorption characteristics of each sound absorbing structure. Specifically, the sound field in an acoustic pipe arranging a sound absorbing structure is determined in accordance with JIS A 1405-2 (titled "Acoustics—Determination of sound absorption coefficient and impedance in impedance tubes—Part 2: Transfer-function method") together with the finite element method and boundary element method so as to calculate the transfer function, thus calculating sound absorption characteristics. In all the sound absorbing structures 1-11 to 1-55, all the thickness L of the air layer, the density $\rho$ of the vibration member 20, and the thickness t of the vibration member 20 are fixed to the same values, so that the resonance frequency fb of the spring-mass system is fixed to the same value. In each of the sound absorbing structures (1) to (6) whose cell sizes are shown in Table 2, the thickness t of the vibration member 20 is fixed to the same value, so that the resonance frequency fb of the spring-mass system is fixed to the same value.

As shown in Table 1 and Table 2, the fundamental frequency fk of the bending system is relatively lower than the resonance frequency fb of the spring-mass system, wherein when the fundamental frequency fk of the bending system is less than 5% of the resonance frequency fb of the spring-mass system (i.e. the sound absorbing structure 1-11 in Table 1, and the sound absorbing structure (1) whose cell size is 252 [mm]×336 [mm] in Table 2), vibration of the bending system occurs at a frequency close to the resonance frequency fb of the spring-mass system in the vibration member 20 so that the vibration amplitude of the vibration member 20 decreases due to the dispersed behavior thereof, thus reducing a sound absorption coefficient. Since the fundamental frequency fk of the bending system is greatly lower than the resonance frequency fb of the spring-mass system so that both frequencies may become independent of each other in vibration, the resonance frequency fb of the spring-mass system primarily dominates the peak frequency pf of sound absorption (where fb≈fp>>fk). In this case, the value of the second term regarding the fundamental frequency fk of the bending system in equation (2) becomes sufficiently low so as to achieve an increase of the cell size, a softness of the vibration member 20, a decrease of the Young's modulus of the vibration member 20, a reduction of the thickness of the vibration member 20, a reduction of the thickness of the air layer, and an increase of the surface density.

As shown in Table 1, when the fundamental frequency fk of the bending system becomes higher than 65% of the resonance frequency fb of the spring-mass system (i.e. the sound absorbing structures 1-15, 1-25, 1-35, 1-45, and 1-55), no vibration having a large amplitude of the bending system occurs in frequency bands lower than the resonance frequency fb of the spring-mass system; hence, the sound absorption coefficient cannot be increased. In addition, the resonance frequency fb of the spring-mass system must be added to the fundamental frequency fk of the bending system so as to increase the peak frequency fp of sound absorption, so that the sound absorption coefficient cannot be increased in low frequency bands lower than the resonance frequency fb of the spring-mass system and the fundamental frequency fk of the bending system (where fb and fk<fp). This indicates sound absorption characteristics dominated by equation (2), thus achieving a reduction of the cell size, a hardness of the vibration member 20, an increase of the Young's modulus of the vibration member 20, an increase of the thickness of the vibration member 20, an increase of the thickness of the air layer, and a reduction of the surface density.

When the fundamental frequency fk of the bending system falls within a range between 5% and 65% of the resonance frequency fb of the spring-mass system (i.e. the sound absorbing structures 1-12 to 1-14, 1-22 to 1-24, 1-33 to 1-34, and 1-44 in Table 1, and the sound absorbing structures (2) to (6) in Table 2), the fundamental vibration of the bending system cooperates with the spring component of the air layer on the backside thereof so as to excite a large-amplitude vibration in the frequency band between the resonance frequency fb of the spring-mass system and the fundamental frequency fk of the bending system, thus increasing the sound absorption coefficient (fb>fp>fk).

When the fundamental frequency fk of the bending system falls within a range between 5% and 40% of the resonance frequency fb of the spring-mass system (i.e. the sound absorbing structures 1-12, 1-13, 1-22, 1-23, and 1-33 in Table 1, and the sound absorbing structures (2) to (6) in Table 2), the peak frequency fp of sound absorption becomes sufficiently lower than the resonance frequency fb of the spring-mass system. This sound absorbing structure is preferable for absorbing sound whose frequency is lower than 300 [Hz] because the fundamental frequency fk of the bending system becomes sufficiently lower than the resonance frequency fb of the spring-mass system due to a low-order mode of elastic vibration.

The present inventors studied conditions allowing the fundamental frequency fk of the bending system to fall within the range between 5% and 65% of the resonance frequency fb of the spring-mass system, thus determining it necessary for any sound absorbing structure, whose cell has a square shape and whose vibration member 20 is bonded and fixed to the partition board 30 and the housing 10, to satisfy inequality (9).

$$3 < \left(\frac{1}{a}\right)^4 \frac{Et^3 L}{(1-\sigma^2)} < 550 \tag{9}$$

Inequality (9) is produced by way of the following values and equations.

By the use of α denoting different dimensionless coefficient on vibration modes, the first-side length "a" of the vibration member, the Young's modulus E of the vibration member, the thickness t of the vibration member, the thickness L of the air layer, the Poisson's ratio σ, the density ρ of the vibration member, the density $\rho_0$ of the air layer, and the sound speed $c_0$ in the atmosphere, the fundamental frequency fk of the bending system is given by equation (a), and the resonance frequency fb of the spring-mass system is given by equation (b).

$$fk = \frac{1}{2\pi} \cdot \alpha \cdot \frac{t}{a^2} \sqrt{\frac{E}{(1-\sigma^2)\rho}} \tag{a}$$

-continued $$fb = \frac{1}{2\pi} \sqrt{\frac{\rho_0 c_0^2}{\rho t L}} \tag{b}$$

Equation (c) satisfies the condition in which the fundamental frequency fk of the bending system falls within the range between 5% and 65% of the resonance frequency fb of the spring-mass system, and it is developed into equation (d).

$$0.05 \leqq fk/fb \leqq 0.65 \tag{c}$$

$$0.05 \times fb \leqq fk \leqq 0.65 \times fb \tag{d}$$

Substituting equation (a) and equation (b) for equation (d) produces equation (e).

$$0.05 \times \sqrt{\frac{\rho_0 c_0^2}{\alpha}} \leq \sqrt{tL \cdot \frac{t}{a^2}} \cdot \sqrt{\frac{E}{(1-\sigma^2)}} \leq 0.65 \times \sqrt{\frac{\rho_0 c_0^2}{\alpha}} \tag{e}$$

In the above, "α" is 10.40 at the minimum resonance frequency of the square shape whose periphery is fixed (see "Practical Vibration Calculation Method" Version 6 (author: Yoichi Kobori, Publisher: Kougaku-Tosho Kabushiki Kaisha), p. 213), wherein equation (e) is developed using $\rho_0 c_0$=414 and $c_0$=340 into the following inequalities, thus producing equation (9).

$$0.05 \times \frac{375.2}{10.4} \leq \frac{1}{a^2} \sqrt{\frac{Et^3 L}{1-\sigma^2}} \leq 0.65 \times \frac{375.2}{10.4}$$

$$1.80 \leq \frac{1}{a^2} \sqrt{\frac{Et^3 L}{1-\sigma^2}} \leq 23.45$$

$$3.24 \leq \frac{1}{a^4} \cdot \frac{Et^3 L}{1-\sigma^2} \leq 549.9$$

$$\therefore 3.0 < \frac{1}{a^4} \cdot \frac{Et^3 L}{1-\sigma^2} < 550$$

With respect to the sound absorbing structure whose cell has a rectangular shape and in which the partition board 30 is bonded to the vibration member 20, which is thus fixed in position, we find out that inequality (10) satisfies the condition in which the fundamental frequency fk of the bending system falls within the range between 5% and 65% of the resonance frequency fb of the spring-mass system by simulation.

$$12 < \left[\left(\frac{1}{a}\right)^2 + \left(\frac{1}{b}\right)^2\right]^2 \left[\frac{Et^3 L}{1-\sigma^2}\right] < 2100 \tag{10}$$

Inequality (10) is produced in such a way that the vibration is analyzed using the finite element method and then the resonance frequency is analyzed with respect to a simply supported state in which the vibration member is simply supported and a fixed state in which the vibration member is fixed in position. Herein, the resonance frequency of the simply supported state is 63.7 Hz, the resonance frequency of the fixed state is 120.5 Hz. The ratio of the resonance frequency of the fixed state over the resonance frequency of the simply supported state is 1.892 and is squared to produce 3.580, which is used as a correction value. Inequality (10) is produced by dividing both sides of inequality (12) by 3.580.

Inequalities (9) and (10) show that the parameters regarding the dimensions and shape of the vibration member 20 such as the cell size, the thickness of the air layer, and the thickness of the vibration member 20 and the parameters regarding the materials and properties of the vibration member 20 such as the Young's modulus, density, and Poisson's ratio are closed related to the condition in which the fundamental frequency fk of the bending system falls within the range between 5% and 65% of the resonance frequency fb of the spring-mass system. That is, it is possible to achieve high-efficient sound absorption by setting the parameters such as the cell size, the thickness of the air layer, and the thickness of the vibration member 20 and the parameters regarding the materials and properties of the vibration member 20 to meet inequalities (9) and (10).

Figure 6:
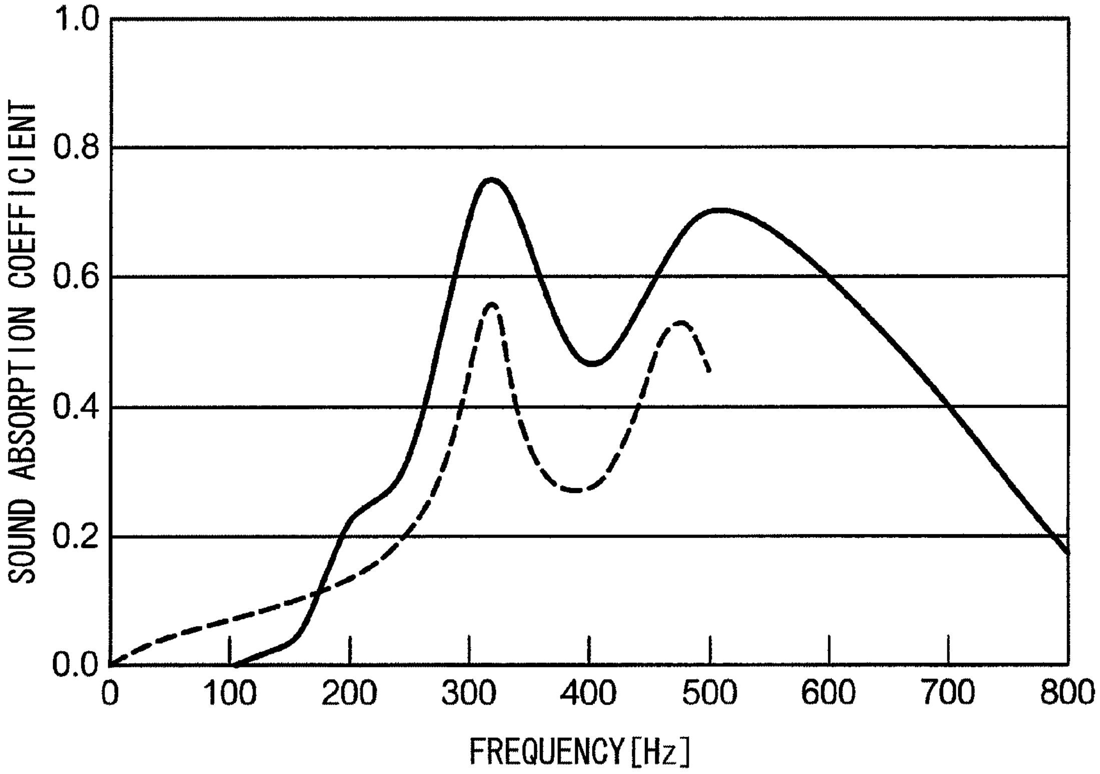
FIG. 6 is a graph showing the result of simulation of the sound absorbing structure on the relationship between the frequency and sound absorption coefficient.

FIG. 6 is a graph showing the simulation result (drawn with a dotted curve) of the sound absorbing structure whose parameters are set in accordance with the above inequalities and the measurement result (drawn with a solid curve based on JIS A 1409 titled "Method for measurement of sound absorption coefficients in a reverberation room") of the actual sound absorption coefficient.

In the above sound absorbing structure, the density of the vibration member 20 is $\rho=940$ [kg/m$^3$], the Poisson's ratio of the vibration member 20 is $\sigma=0.4$, the thickness of the vibration member 20 is t=0.85 [mm], the Young's modulus of the vibration member 20 is $E=8.8\times10^8$ [N/m$^2$], the lateral length is 126 [mm], and the longitudinal length is 112 [mm], wherein the resonance frequency fb of the spring-mass system is 471 [Hz], and the fundamental frequency fk of the bending system is 131 [Hz], which is 28% of the resonance frequency fb.

FIG. 6 shows that a sound absorption peak appears at about 315 [Hz] which is lower than the resonance frequency fb of the spring-mass system (i.e. 471 Hz) in both the simulation result and measurement result of the sound absorbing structure. This indicates that the simulation result is appropriate.

(B) Variations

It is possible to modify the first embodiment of the present invention in various ways.

In the sound absorbing structure of the first embodiment, the housing 10 has the bottom portion 11, whereas it is possible to eliminate the bottom portion 11 from the housing 10, in which an opening is formed in the side opposite to the side bonded to the vibration member 20. In this constitution, when the opening of the housing 10 is fixed to the wall surface of a room, an air layer is formed by the wall surface, the side walls 12A to 12D of the housing 10, and the vibration member 20, thus achieving a plate/diaphragm-vibration sound absorbing structure. The air layer formed inside the sound absorbing structure 1-11 by the housing 10, the vibration member 20, and the wall surface of a room is not necessarily closed so that it may have a small gap or opening. In summary, it is required to demonstrate a sound absorbing function due to vibration of the vibration member 20 supported by the housing 10.

In the above variation, the vibration member 20 is bonded and fixed to the housing 10 and the partition board 30 so that the bonded portion thereof is limited in displacement (or movement) and rotation; but this is not a restriction. It is possible to further modify the vibration member 20 in a simply supported state which limits displacement with the housing 10 but allows rotation about the housing 10.

The inventors discovered that inequality (11) satisfies the condition in which the fundamental frequency of the bending system due to elastic vibration falls within the range between 5% and 65% of the resonance frequency of the spring-mass system in the sound absorbing structure having a square-shaped cell.

$$10 < \left(\frac{1}{a}\right)^4 \frac{Et^3 L}{1-\sigma^2} < 1820 \tag{11}$$

Inequality (11) is produced by analyzing vibration in accordance with the finite element method and then by analyzing the resonance frequency with respect to a simply supported state in which the vibration member is simply supported and a fixed state in which the vibration member is fixed in position. Herein, the resonance frequency of the simply supported state is 88 Hz, while the resonance frequency of the fixed state is 160 Hz. The ratio of the resonance frequency of the fixed state over the resonance frequency of the simply supported state is 1.818 and is squared to produce 3.306, which is used as a correction value. Inequality (11) can be produced by multiplying both sides of inequality (9) by 3.306.

In the case of the sound absorbing structure whose cell has a rectangular shape and whose vibration member 20 is in a simply supported state, the present inventors discovered that inequality (12) satisfies the condition in which the fundamental frequency of the bending system due to elastic vibration falls within the range between 5% and 65% of the resonance frequency of the spring-mass system.

$$40 < \left[\left(\frac{1}{a}\right)^2 + \left(\frac{1}{b}\right)^2\right]^2 \left[\frac{Et^3 L}{1-\sigma^2}\right] < 7300 \tag{12}$$

Inequality (12) is produced as follows:

The fundamental frequency fk of the bending system is represented by equation (f), while the resonance frequency fb of the spring-mass system is represented by equation (b). In equation (f), "a" denotes the long-side length of a cell, and "b" denotes the short-side length of a cell.

$$fk = \frac{1}{2\pi}\sqrt{\frac{(1/a^2 + 1/b^2)^2 \pi^4 E t^3}{12\rho t(1-\sigma^2)}} \tag{f}$$

The condition in which the fundamental frequency fk of the bending system falls within the range between 5% and 65% of the resonance frequency fb of the spring-mass system is represented by inequality (g), which is developed into inequality (h).

$$0.05 \leqq fk/fb \leqq 0.65 \tag{g}$$

$$0.05\times fb \leqq fk \leqq 0.65\times fb \tag{h}$$

Substituting inequality (f) and equation (b) for inequality (h) produces inequality (i), which is developed into inequality (12).

$$43.0 \leqq (1/a^2+1/b^2)^2 Et^3 L(1-\sigma^2) \leqq 7238 \tag{i}$$

$$\therefore 40.0 \leqq (1/a^2+1/b^2)^2 Et^3 L(1-\sigma^2) \leqq 7300$$

In the present embodiment, both the housing 10 and the vibration member 20 are square-shaped when viewed from above; however, they are not necessarily limited to the square shape, which can be changed to a rectangular shape or other shapes.

It is possible to modify the present embodiment such that the housing 10 has a cylindrical shape whose one end is closed, wherein the vibration member 20 having a circular-disk shape is bonded to the "circular" opening of the housing

10 so as to form the external appearance of the sound absorbing structure having a cylindrical shape. In the sound absorbing structure in which the vibration member 20 having a circular-disk shape is bonded and fixed to the housing 10, the condition in which the fundamental frequency of the bending system due to elastic vibration falls within the range between 5% to 65% of the resonance frequency of the spring-mass system, the present inventors determined it necessary to satisfy inequality (13) in which R denotes the radius of the vibration member 20.

$$40 < \left[\left(\frac{1}{R}\right)^2\right]^2 \frac{Et^3 L}{1-\sigma^2} < 6850 \tag{13}$$

Inequality (13) is produced as follows:

The fundamental frequency fk of the bending system is represented by equation (j) using the radius R of the vibration member and a dimensionless coefficient $\alpha_{dc}$ dependent upon the vibration mode, while the resonance frequency fb of the spring-mass system is represented by equation (b).

$$fk = \frac{1}{2\pi} \cdot \frac{\alpha_{dc} t}{R^2 \sqrt{\dfrac{E}{\rho(1-\sigma^2)}}} \tag{j}$$

The condition in which the fundamental frequency fk of the bending system falls within the range between 5% and 65% of the resonance frequency fb of the spring-mass system is represented by inequality (k). Substituting equation (j) and equation (b) for inequality (k) produces inequality (l).

$$0.05 \le fk / fb \le 0.65 \tag{k}$$

$$\frac{0.05}{\alpha_{dc}\sqrt{\rho_0 c_0^2}} \le \sqrt{\frac{Et^3 L}{(1-\sigma^2)R^2}} \le \frac{0.65}{\alpha_{dc}\sqrt{\rho_0 c_0^2}} \tag{l}$$

In the case of the minimum resonance frequency of a circular shape whose periphery is fixed in position, $\alpha_{dc}$ is 2.948 (see "Practical Vibration Calculation Method" Version 6 (author: Yoichi Kobori, Publisher: Kougaku-Tosho Kabushiki Kaisha), p. 208), wherein inequality (l) is developed using $\rho_0 c_0$=414 and $c_0$=340 into the following inequalities, thus producing inequality (13).

$$6.363 \le \sqrt{\frac{Et^3 L}{R^2(1-\sigma^2)}} \le 82.72$$

$$40.49 \le \frac{Et^3 L}{(1-\sigma^2)R^4} \le 6843$$

$$\therefore 40.0 < \frac{Et^3 L}{(1-\sigma^2)R^4} z < 6850$$

In the sound absorbing structure in which the vibration member 20 having a circular-disk shape is simply supported by the housing 10 so as to limit the displacement thereof but to allow the rotation thereof, the present inventors determined the condition, in which the fundamental frequency of the bending system due to elastic vibration falls within the range of 5% to 65% of the resonance frequency of the resonance frequency of the spring-mass system, to satisfy inequality (14).

$$161 < \left[\left(\frac{1}{R}\right)^2\right]^2 \frac{Et^3 L}{1-\sigma^2} < 27700 \tag{14}$$

Inequality (14) is produced by analyzing vibration in accordance with the finite element method and then by analyzing the resonance frequency with respect to a simply supported state in which the vibration member is simply supported and a fixed state in which the vibration member is fixed in position. Herein, the resonance frequency of the simply supported state is 91 Hz, while the resonance frequency of the fixed state is 183 Hz. The ratio of the resonance frequency of the fixed state over the resonance frequency of the simply supported state is 2.011 and is squared to produce 4.044, which is used as a correction value. Multiplying both sides of inequality (13) by 4.044 results in inequality (14).

The sound absorbing structure of the present embodiment in which both the vibration member 20 and air layer are reduced in thickness does not occupy a large space at the sound absorbing position thereof; hence, it is possible to achieve sound absorption with a reduced space. In order to achieve sound absorption with a reduced space, it is preferable that the thickness of the vibration member 20 be less than 30 mm, and the thickness of the air layer be less than 30 mm.

The sound absorbing structure of the present embodiment can be arranged in various types of sound chambers. Sound chambers designate rooms of general houses and buildings, soundproofing rooms, halls, theaters, listening rooms of audio devices, meeting rooms, prescribed rooms of various transport systems such as vehicles, aircrafts, and ships, and internal/external spaces of housings of sound generators such as speakers and musical instruments, for example.

(C) Design of Sound Absorbing Structure

A computer apparatus can be used to design a sound absorbing structure 1 to suit the above conditions defined by equations and inequalities.

Figure 7:
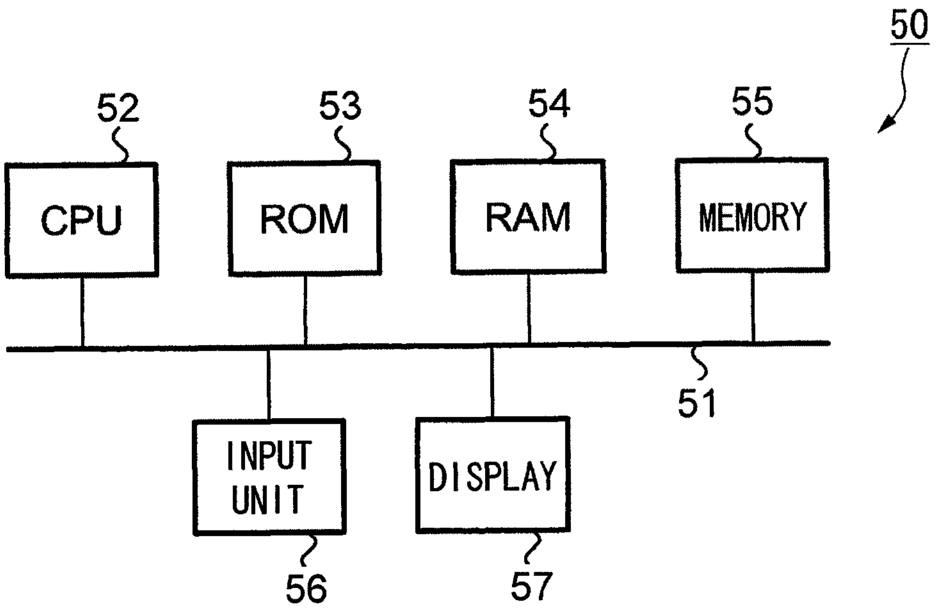
FIG. 7 is a block diagram showing a design apparatus used for designing sound absorbing structures.

FIG. 7 is a block diagram showing a design apparatus 50 for designing a sound absorbing structure suited to the above conditions defined by equations and inequalities. The design apparatus 50 is constituted of a CPU 52, a ROM 53, a RAM 54, a memory 55, an input unit 56, and a display 57, all of which are interconnected together via a bus 51.

The memory 55 has a hard-disk unit which stores an OS program for controlling the design apparatus 50 to realize an operation system and a design program for designing sound absorbing structures satisfying the above conditions defined by equations and inequalities. The input unit 56 has an input device such as a keyboard and a mouse, which are used to input parameters (e.g. the thickness and size (e.g. lateral and longitudinal lengths, radius, etc.)) of the vibration member 20, the Poisson's ratio of the vibration member 20, and the Young's modulus of the vibration member 20) which are necessary to process user's instructions from the design apparatus 50 and to design sound absorbing structures. The display 57 has a liquid crystal display, which displays an input menu for inputting parameters necessary for designing sound absorbing structures and which displays parameters satisfying the above conditions defined by equalities and inequalities.

The ROM 53 stores an initial program loader (IPL). When electric power is applied to the design apparatus 50, the CPU 52 reads the IPL from the ROM 53 so as to start operation.

When the CPU 52 starts operation by the IPL, the OS program is read from the memory 55 and is executed so as to achieve the function for receiving instructions input by the input unit 56, the function for displaying various data and images on the screen of the display 57, and the function for controlling the memory 55 as well as basic functions executed by the computer apparatus. When the CPU 52 executes the design program, the design apparatus 50 inputs parameters regarding the sound absorbing structure 1 so as to achieve the function for designing the sound absorbing structure 1.

Figure 8:
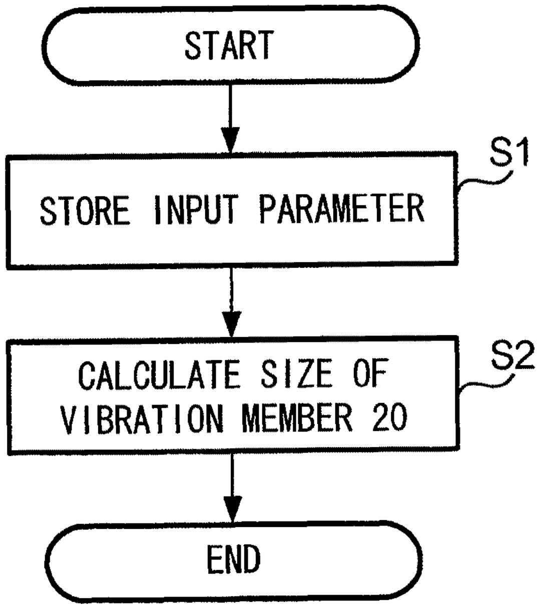
FIG. 8 is a flowchart showing a design process of the sound absorbing structure.

FIG. 8 is a flowchart showing a part of the processing of the design apparatus 50 executing the design program.

When the sound absorbing structure 1 in which the vibration member 20 has a square shape is designed based on the predetermined thickness of the air layer and the predetermined material of the vibration member 20 and based on the prescribed size satisfying the above equations and inequalities, the user of the design apparatus 50 operates the input unit 56 so as to input and store parameters such as the thickness of the air layer, the Young's modulus of the vibration member 20, and the thickness and Poisson's ratio of the vibration member 20 in the RAM 54 (step S1). Then, the design apparatus 50 applies the parameters stored in the RAM 54 to the above equations and inequalities so as to calculate first-side length of the vibration member 20 (step S2), thus displaying the calculated length on the screen of the display 57.

As described above, the design apparatus 50 can easily calculate the size of the sound absorbing structure 1 upon receipt of the parameters input by the user. It is possible for the design apparatus 50 to input the size, Young's modulus, thickness, and Poisson's ratio of the vibration member 20 so as to calculate the thickness of the air layer satisfying the above equations and inequalities. Alternatively, it is possible for the design apparatus 50 to input the size, Young's modulus, and Poisson's ratio of the vibration member 20 as well as the thickness of the air layer so as to calculate the thickness of the vibration member 20 satisfying the above equations and inequalities.

The design apparatus 50 performs calculations based on input parameters so as to produce the fundamental frequency of elastic vibration and the resonance frequency of the spring-mass system, thus displaying calculation results on the screen of the display 57. These frequencies can be calculated by the design program in accordance with the finite element method and boundary element method, for example.

2. Second Embodiment

Figure 9:
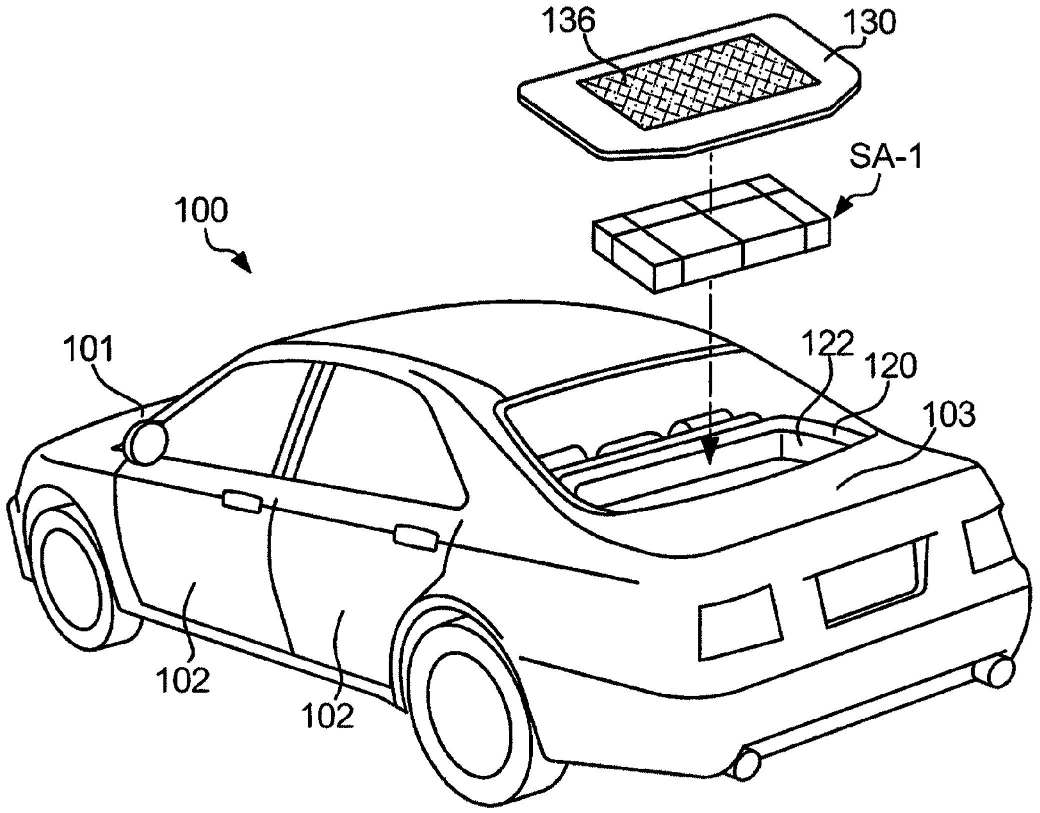
FIG. 9 is a perspective view showing the external appearance of a vehicle adopting sound absorbers according to a second embodiment of the present invention.

FIG. 9 is a perspective view showing the external appearance of a four-door sedan vehicle 100 adopting a sound absorber SA_1 according to a second embodiment of the present invention. In the vehicle 100, a hood (or a bonnet) 101, four doors 102, and a trunk door 103 are each attached to a chassis 110 corresponding to a base of a vehicle structure in an open/close manner.

Figure 10:
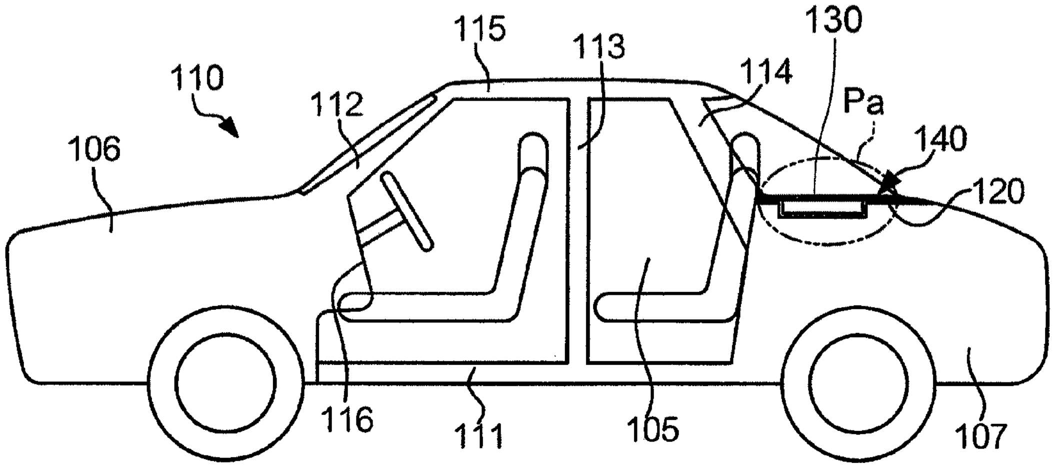
FIG. 10 is a side view showing a chassis of the vehicle.

FIG. 10 is a side view showing the chassis 110 of the vehicle 100. The chassis 110 is equipped with a floor 111, a front pillar 112 extending upwardly from the floor 111, a center pillar 113, a rear pillar 114, a roof 115 (which is supported by the pillars 112, 113, and 114), an engine partition 116 for partitioning the internal space of the vehicle 100 into a compartment 105 and an engine room 106, and a trunk partition 120 for partitioning between the compartment 105 and a luggage space 107. The trunk partition 120 is equipped with a rear package tray 130.

As shown in FIG. 10, the trunk partition 120 includes a back support of a rear seat and is thus bent in an L-shape in cross section.

The following description is based on the premise that the trunk partition 120 partitions between the compartment 105 and the luggage space 107.

Figure 11:
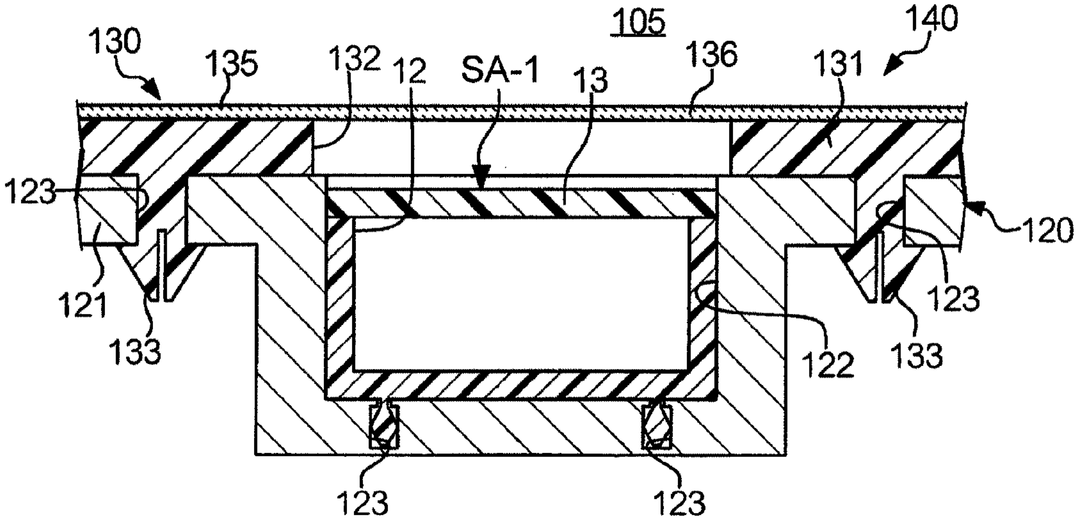
FIG. 11 is an enlarged sectional view of a position Pa in FIG. 10.
Figure 12:
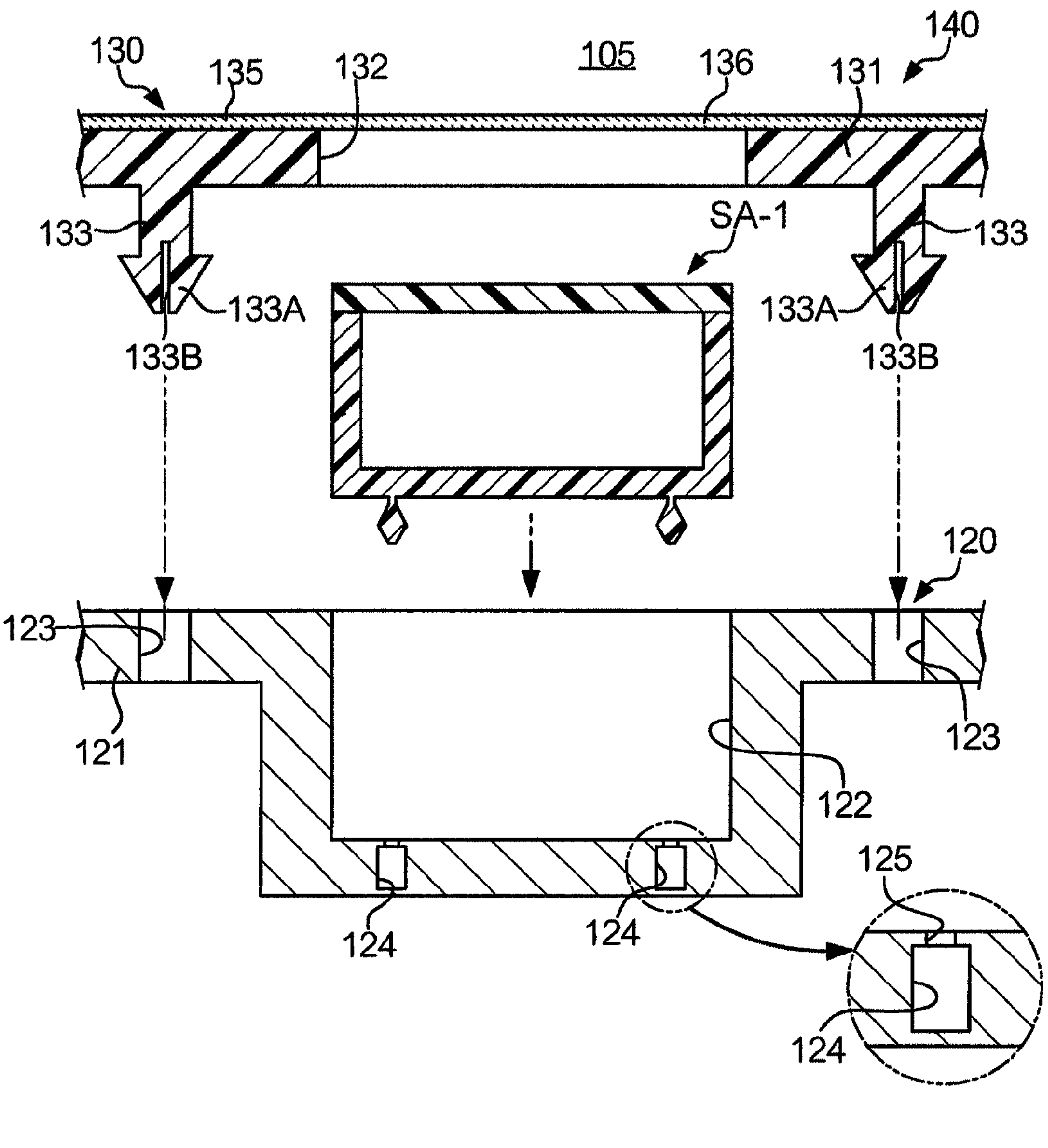
FIG. 12 is an exploded perspective view related to FIG. 11.

The second embodiment is characterized in that the box-shaped sound absorber SA_1 is attached to the trunk partition 120 of the chassis 110. FIG. 11 is a cross-sectional view of a position Pa in FIG. 10, and FIG. 12 is an exploded sectional view for assembling the sound absorber SA_1 with the trunk partition 120. FIGS. 11 and 12 show a single sound absorber SA_1; in actuality, a plurality of sound absorbers SA_1 having different shapes is installed in the trunk partition 120 as show in FIG. 9. In this connection, the shape of the sound absorber SA_1 is similar to or identical to the shape of the trunk partition 120 for partitioning between the compartment 105 and the luggage space 107.

As shown in FIG. 11, the rear package tray 130 is attached to the trunk partition 120 so as to form a trunk board 140.

The rear package tray 130 is constituted of a core material 131 composed of a wooden fiber board and a fabric having acoustic transmissivity. The surface of the core material 131 is covered with a surface material 135. A through-hole 132 having a rectangular opening is formed in a part of the core material 131 positioned opposite to the sound absorber SA_1. That is, the through-hole 132 of the surface material 135 forms an acoustic transmitter 136 which transmits sound pressure occurring in the compartment 105 toward the sound absorber SA_1. The opening shape of the through-hole 132 is not necessarily limited to the rectangular shape, which can be changed to a circular shape. That is, the opening shape of the through-hole 132 is determined to transmit air of the compartment 105 to the sound absorber SA_1.

3. Third Embodiment

Figure 13:
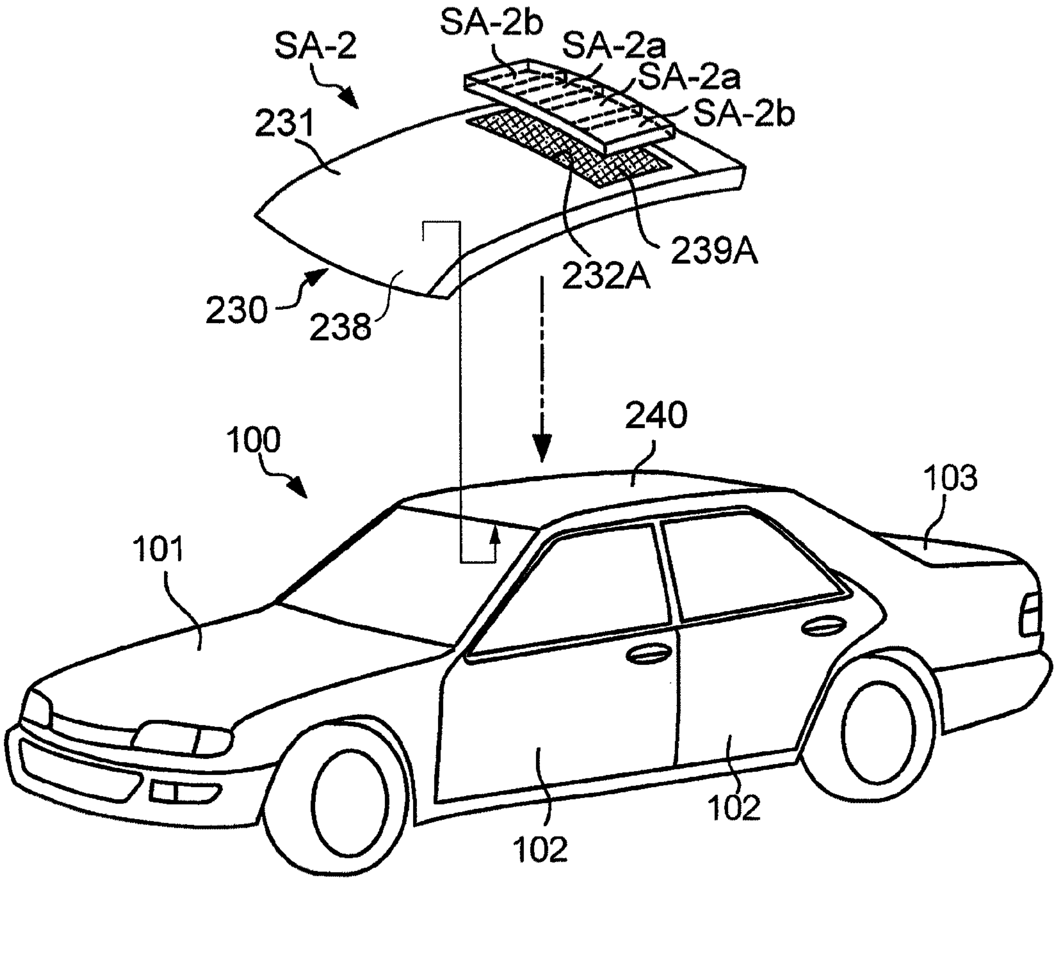
FIG. 13 is a perspective view showing the external appearance of a vehicle adopting sound absorbers according to a third embodiment of the present invention.
Figure 14:
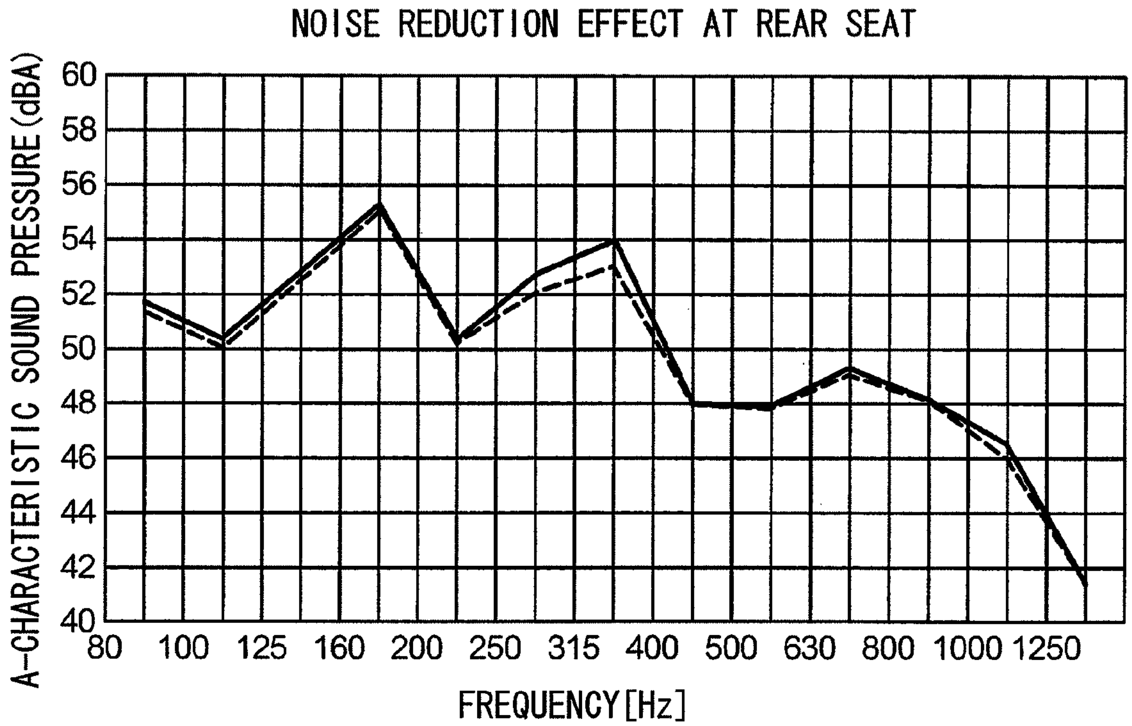
FIG. 14 is a graph showing a noise reduction effect in a rear seat by a sound absorber installed in a roof of the vehicle.

A third embodiment of the present invention will be described with reference to FIGS. 13 and 14. In FIG. 13, the constituent elements identical to those shown in FIGS. 9 and 10 are designated by the same reference numerals.

FIG. 13 is a perspective view showing the external appearance of the four-door sedan vehicle 100 adopting a sound absorber SA_2 according to the third embodiment of the present invention. The hood 101, the four doors 102, and the trunk door 103 are each attached to the chassis 110 corresponding to the base of the vehicle structure in an open/close manner. The chassis 110 of the vehicle 100 is formed as shown in FIG. 10. Compared to the second embodiment in which the sound absorber SA_1 is attached to the rear package tray 130, the third embodiment is designed to attach the sound absorber SA_2 to a roof 240. The roof 240 is constituted of a roof outer panel (corresponding to the roof 115 in FIG. 10) and a roof inner panel 230.

The third embodiment is characterized in that the box-shaped sound absorber SA_2 is attached to the roof 240 of the vehicle 100. In FIG. 13, the sound absorber SA_2 includes four sound absorbers SA_2*a* and SA_2*b* having different sizes in total.

In the roof 240, the roof inner panel 230 is clipped to the roof outer panel forming a part of the chassis 110.

In the roof inner panel 230, the surface of a core material 231 composed of a wooden fiber board is covered with a surface material 238 composed of a fabric having acoustic transmissivity. A rectangular through-hole 232A is formed in the core material 231 in proximity to the rear seat, wherein a part of the surface material 238 positioned opposite to the through-hole 232A forms an acoustic transmitter 239A. The sound absorber SA_2 communicates with the compartment 105 via the acoustic transmitter 239A. The acoustic transmitter 239A is not necessarily attached to the roof 240 in proximity to the rear seat, which can be changed to the front seat. FIG. 14 is a graph showing a noise reduction effect at the rear seat.

4. Fourth Embodiment

Figure 15:
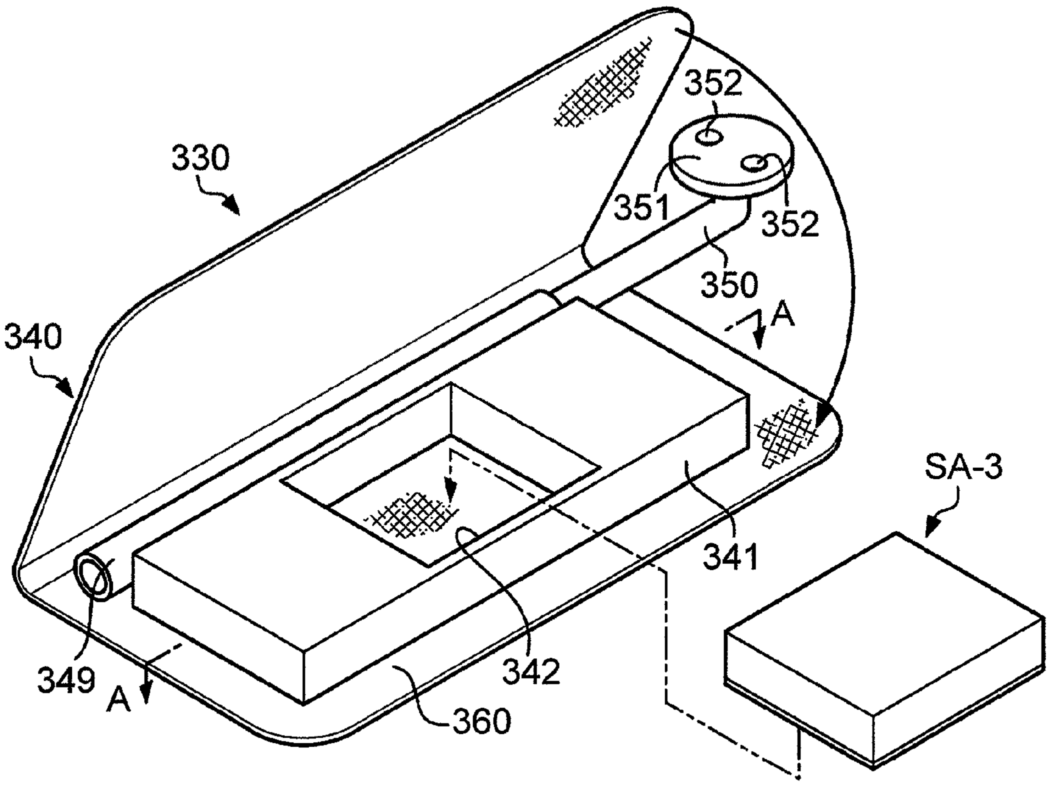
FIG. 15 is a development illustration of a sun visor adopting a sound absorber according to a fourth embodiment of the present invention.
Figure 16:
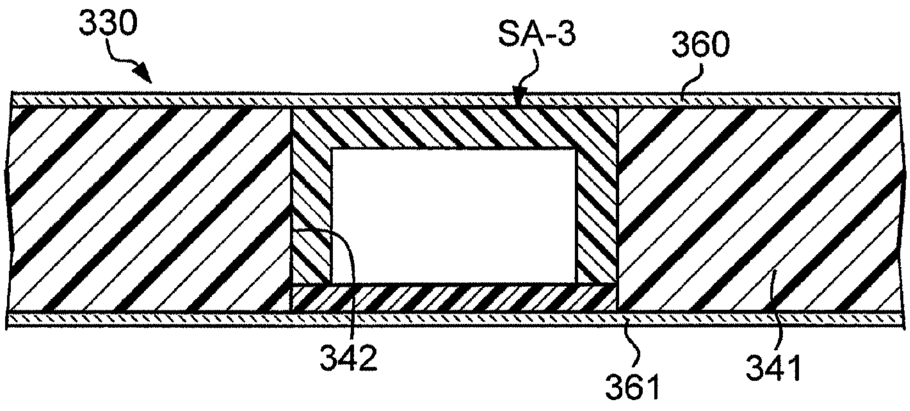
FIG. 16 is a sectional view taken along line A-A in FIG. 15.

A fourth embodiment is characterized in that a box-shaped sound absorber SA_3 is attached to a sun visor 330 of the vehicle 100. FIG. 15 is a development of the sun visor 330 attached to the upper portion of the roof 115 of the vehicle 100, and FIG. 16 is a cross-sectional view taken along line A-A in FIG. 15.

The sun visor 330 is constituted of a plate-shaped light insulation portion 340 and an L-shaped support shaft 350 for supporting the light insulation portion 340 in a rotatable manner.

The light insulation portion 340 is constituted of a core material 341 composed of an ABC resin (or engineering plastic) and a surface material 360 composed of a nonwoven fabric having acoustic transmissivity. The core material 341 is covered with the surface material 360 in such a way that respective sides of the surface material 360 are bonded together so as to cover the surface and backside of the core material 341.

A bracket 351 used for attaching the sun visor 330 to the roof 115 is unified with one end of the support shaft 350. A pair of screw holes 352 is formed in the bracket 351. The sun visor 330 is fixed to the roof 115 by screwing the bracket 351 to a predetermined position of the roof 115.

A rectangular through-hole 342 used for attaching the sound absorber SA_3 is formed in the core material 341. The through-hole 342 of the surface material 360 serves as an acoustic transmitter 361.

5. Fifth Embodiment

A fifth embodiment is characterized in that a box-shaped sound absorber SA_4 is attached to the rear pillar 114. In actuality, it is possible to attach a plurality of sound absorbers SA_4 having different shapes to the rear pillar 114.

Figure 17:
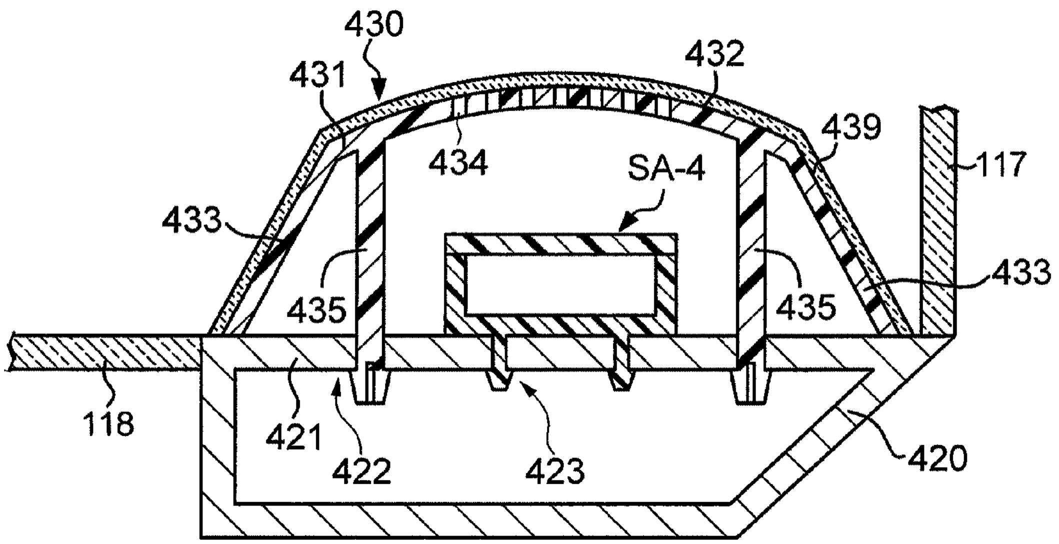
FIG. 17 is a sectional view showing a sound absorber according to a fifth embodiment of the present invention, which is installed in a rear pillar of a vehicle.

FIG. 17 is a cross-sectional view of the sound absorber SA_4 attached to the rear pillar 114. The rear pillar 114 is equipped with a rear outer panel 420 (which forms a part of the chassis 110) and a rear inner panel 430 (which is attached to the rear outer panel 420).

The rear outer panel 420 is formed using a planar portion 421 of a rectangular parallelepiped shape having a trapezoidal cross section. Fitting holes 422 fitted with the rear inner panel 430 and fitting holes 423 fitted with projections of the sound absorber SA_4 are formed in the planar portion 421. A rear glass 117 is disposed at one end of the rear outer panel 420 via a seal (not shown), and a door glass 118 is disposed at the other end of the rear outer panel 420 via a seal (not shown).

The rear inner panel 430 is constituted of a core material 431 composed of a polypropylene resin and a surface material 439 composed of a fabric having acoustic transmissivity, wherein the surface of the core material 431 is covered with the surface material 439.

The core material 431 is constituted of a circular portion 432 and an incline portion 433 (which extends outside of the circular portion 432). A plurality of through-holes 434 is formed in the circular portion 432. The rear pillar 114 communicates with the compartment 105 via the through-holes 434.

Figure 18:
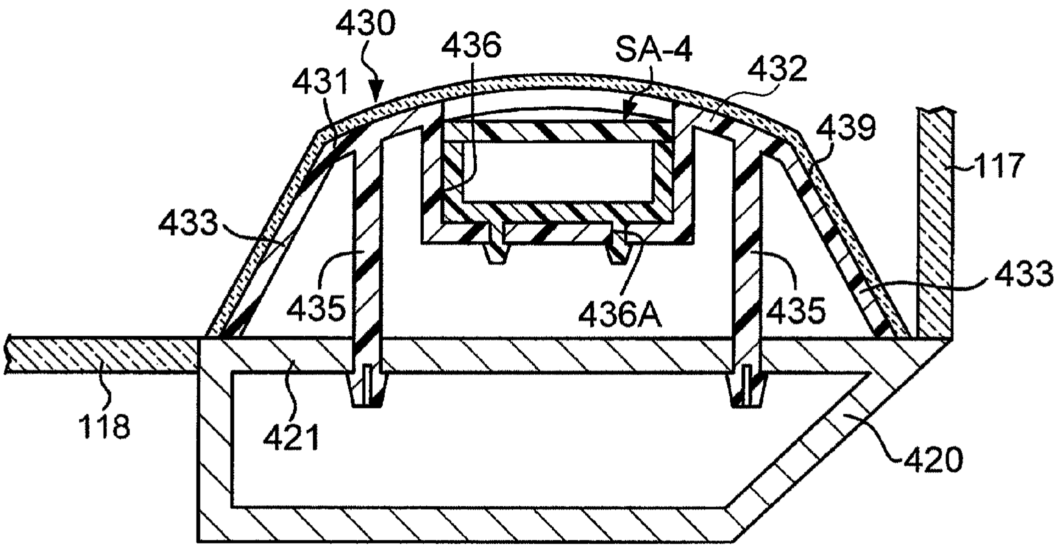
FIG. 18 is a sectional view showing a variation of the sound absorber shown in FIG. 17.

FIG. 18 shows a variation of the fifth embodiment in which the sound absorber SA_4 is inserted into a rectangular recess 436 of the core material 431, which is opened in the compartment 105. Fitting holes 436A are formed in the bottom portion of the recess 436. The sound absorber SA_4 is fixed inside the recess 436 while the projections thereof are inserted into the fitting holes 436A.

The present embodiment is designed to attach the sound absorber SA_4 to the rear pillar 114; but this is not a restriction. For instance, it is possible to attach the sound absorber SA_4 to the front pillar 112 or the center pillar 113.

6. Sixth Embodiment

A sixth embodiment is characterized in that a box-shaped sound absorber SA_5 is attached to the door 102 of the vehicle 100.

The interior of the door 102 includes a door-trim base 520, an interior material 530, an armrest 540, and a door pocket 550. The interior material 530 is constituted of the door-trim base 520 composed of a synthetic resin and a surface material 535 composed of a nonwoven fabric having acoustic transmissivity. The surface of the door-trim base 520 is covered with the surface material 535.

Figure 19:
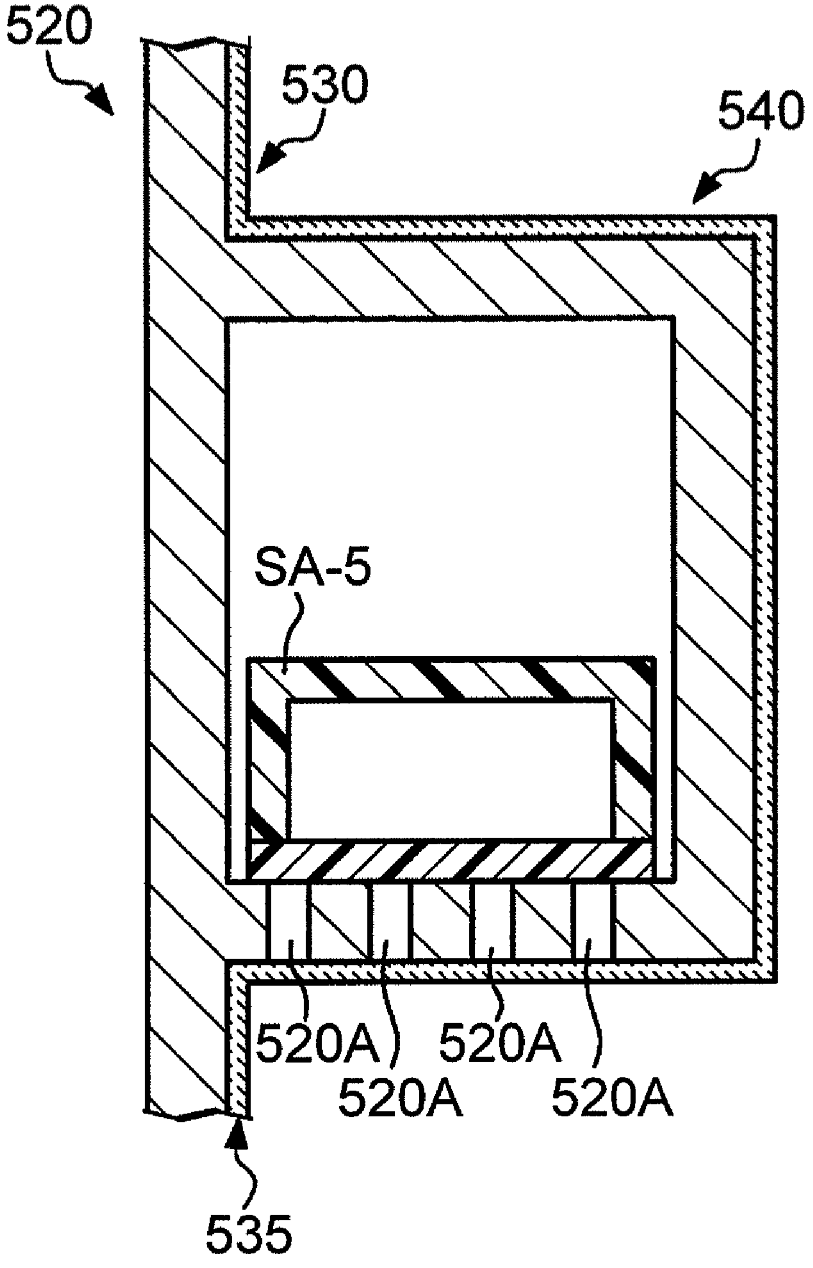
FIG. 19 is a sectional view showing a sound absorber according to a sixth embodiment of the present invention, which is installed in a door of a vehicle.

FIG. 19 shows that the sound absorber SA_5 is installed inside the armrest 540 in communication with a plurality of through-holes 520A formed in the door-trim base 520.

Figure 20:
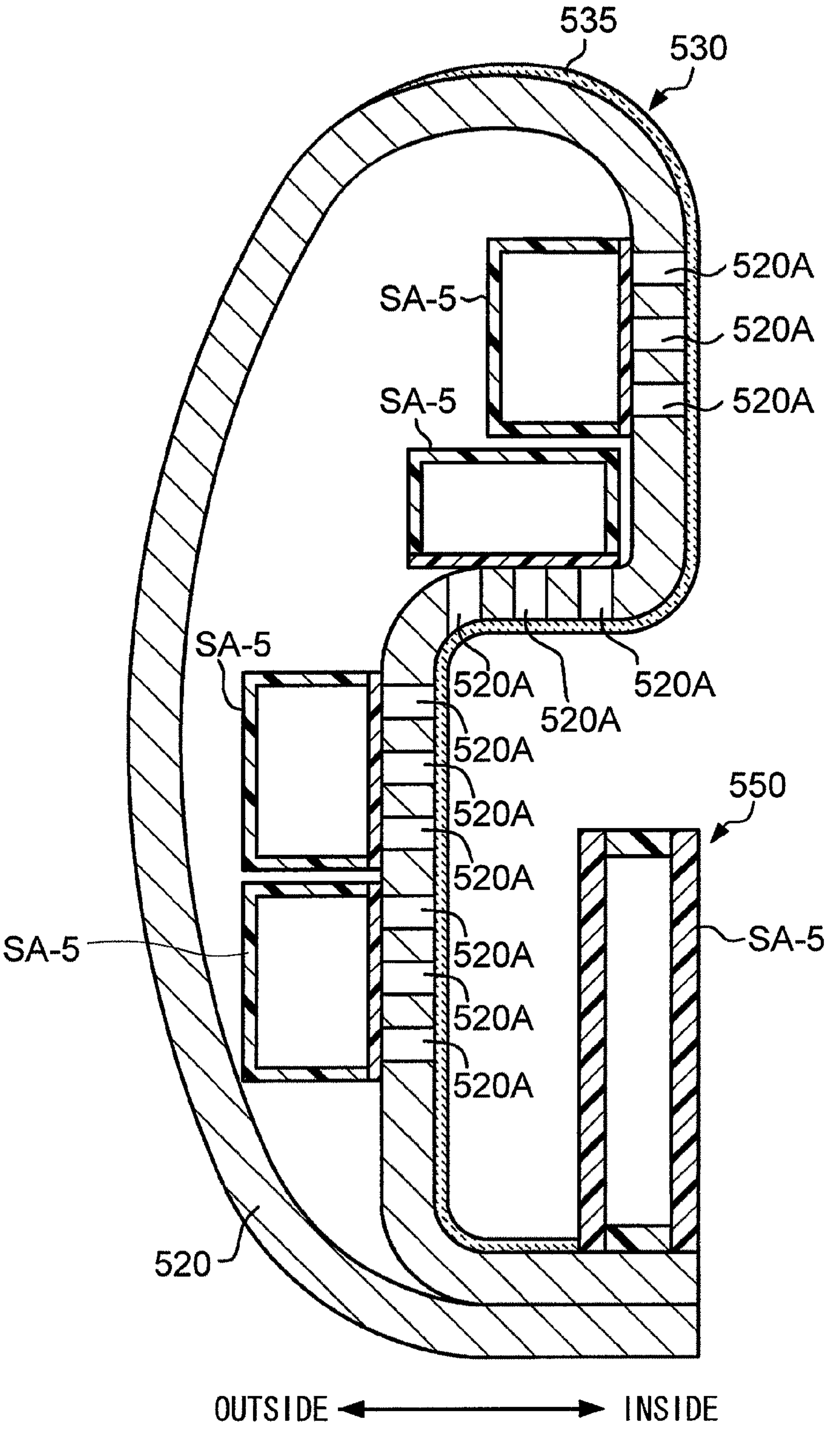
FIG. 20 is a sectional view showing a modified example of the sound absorber shown in FIG. 19.

FIG. 20 shows that a plurality of sound absorbers SA_5 is installed inside the interior material 530 in communication with a plurality of through-holes 520A, while another sound absorber SA_5 is used for the door pocket 550.

7. Seventh Embodiment

Figure 21:
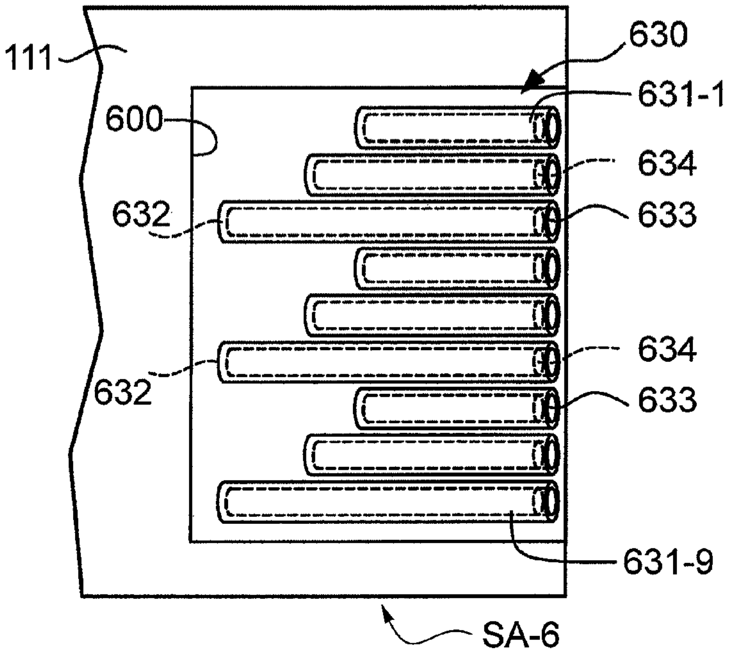
FIG. 21 is a partly cut plan view showing a sound absorber according to a seventh embodiment of the present invention, which is installed in a floor of a vehicle.

A seventh embodiment is characterized in that a sound absorber SA_6 composed of a plurality of sound absorbing pipes is installed in the floor 111 of the vehicle 100. As shown in FIG. 21, a sound absorber 630 (i.e., the sound absorber SA_6) is installed in a recess 600 formed in the floor 111.

The sound absorber 630 is formed by interconnecting and unifying a plurality of pipes 631 (e.g. 631-1 to 631-9) having different lengths which are linearly aligned. Each pipe 631 is a linear rigid pipe which is composed of a synthetic resin and whose cross section has a circular shape. One end of each pipe 631 is closed in the form of a closed portion 632, while the other end is opened in the form of an opening (serving as an acoustic transmitter) 633, wherein the inside of each pipe 631 is a hollow portion 634. The opening 633 of each pipe 631 communicates with the compartment 105 via a gap which is formed when the door 102 is closed.

Figure 22:
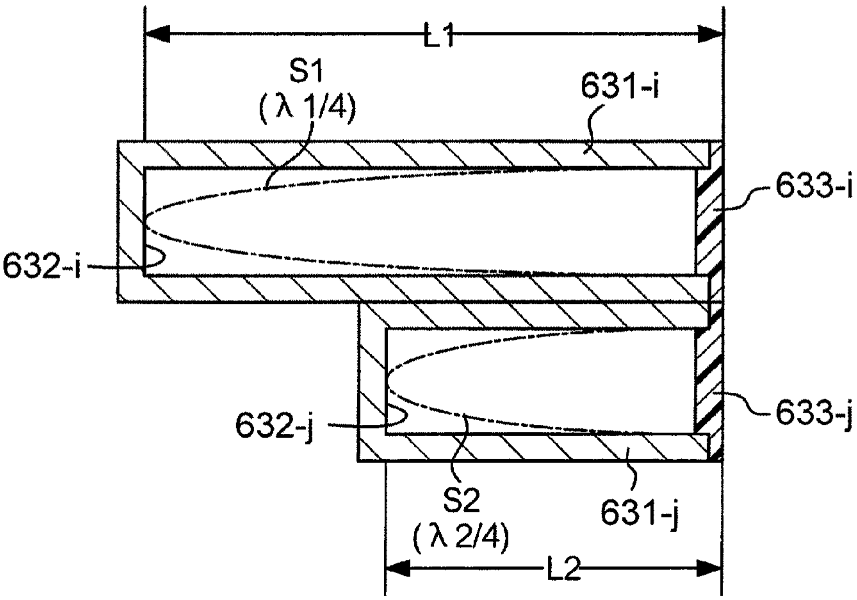
FIG. 22 is an illustration used for explaining the sound absorption principle of a sound absorber composed of plural pipes.

FIG. 22 shows the relationship between adjacent pipes 631-*i* and 631-*j* whose hollow portions have different lengths L1 and L2. Sound waves of wavelengths $\lambda 1$ and $\lambda 2$ (where $L1=\lambda 1/4$, $L2=\lambda 2/4$), which are four times longer than the lengths L1 and L2, create standing waves S1 and S2, which in turn cause vibrations repeatedly propagating in the pipes 631-*i* and 631 -*j* so as to consume acoustic energy, thus achieving sound absorption about the wavelengths $\lambda 1$ and $\lambda 2$.

Figure 23A:
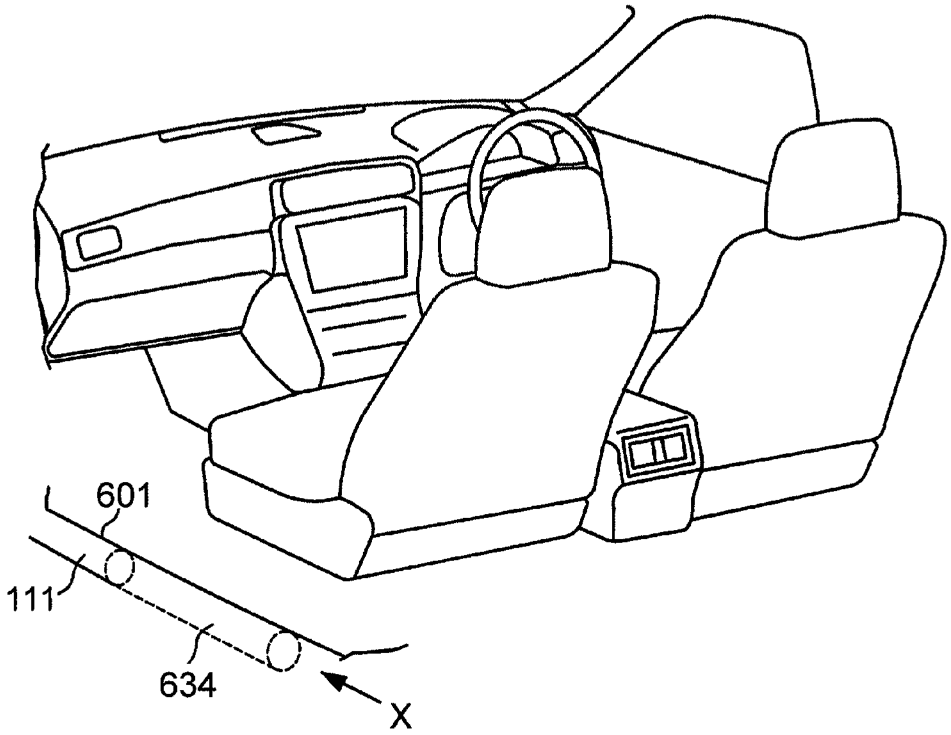
FIG. 23A is a perspective view showing a modified example of the seventh embodiment.
Figure 23B:
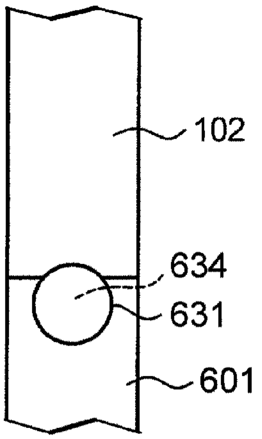
FIG. 23B is an illustration showing a side sill of the floor viewed in an X-direction of FIG. 23A.

FIG. 23A shows a variation of the seventh embodiment, wherein the pipe 631 is disposed in a side-sill 601 of the floor 111 such that the hollow portion 634 thereof extends in the front-back direction of the vehicle 100. FIG. 23B is an illustration of the side-sill 601 viewed in the X-direction of FIG. 23A.

8. Eighth Embodiment

An eighth embodiment is characterized in that a sound absorber SA_8 is installed in an instrument panel 700 disposed below a front glass 105F in the compartment 105 of the vehicle 100.

Figure 24:
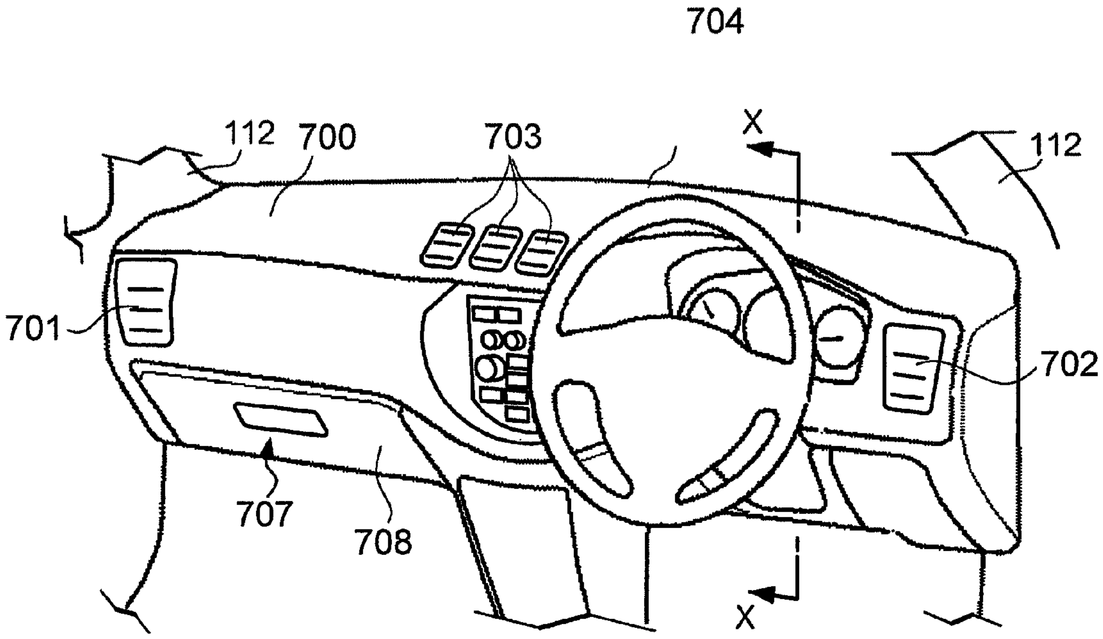
FIG. 24 is a perspective view showing the external appearance of an instrument panel of a vehicle adopting a sound absorber according to an eighth embodiment of the present invention.

FIG. 24 is a perspective view showing the external appearance of the instrument panel 700. The sound absorber SA_8 is disposed in a space S between the instrument panel 700 and the engine partition 116.

The instrument panel 700 is equipped with various instruments, speakers 701 and 702 of an audio device, and warm/cool air outlets 703. A plurality of defroster outlets 704 is formed in the upper surface of the instrument panel 700 so as to output a warm air supplied from an air-conditioner unit 705. A glove box 707 is arranged in the lower-left position of the instrument panel 700 and is closed by a cover 708.

Figure 25:
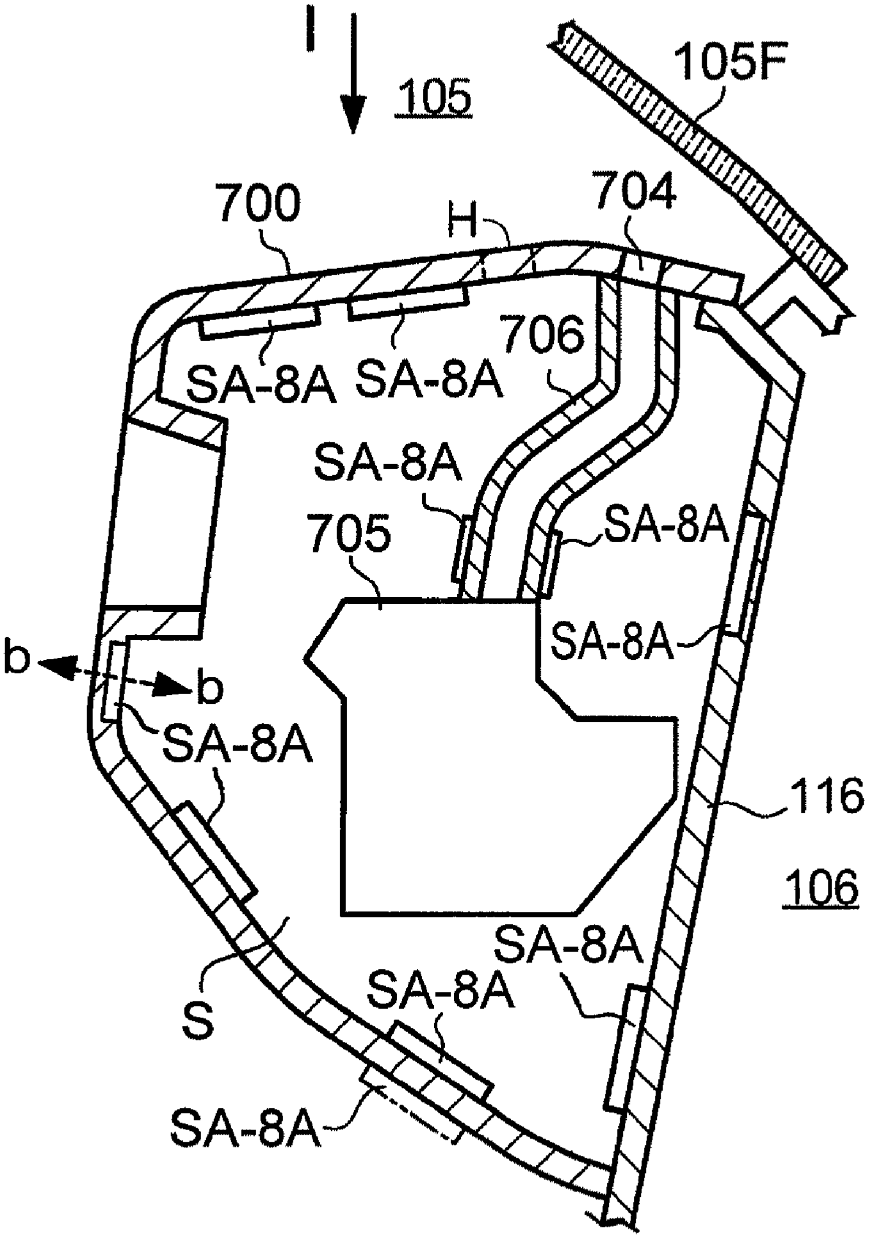
FIG. 25 is a sectional view taken along line X-X in FIG. 24, which shows the internal structure of the instrument panel arranging plural sound absorbers.

FIG. 25 shows the internal structure of the instrument panel 700 and is a cross-sectional view taken along line X-X in FIG. 24. The air-conditioner unit 705, a defrost duct 706, and a plurality of sound absorbers SA_8A are arranged in the internal space S of the instrument panel 700. The internal space S of the instrument panel 700 communicates with the compartment 105 via a hole H.

Figure 26:
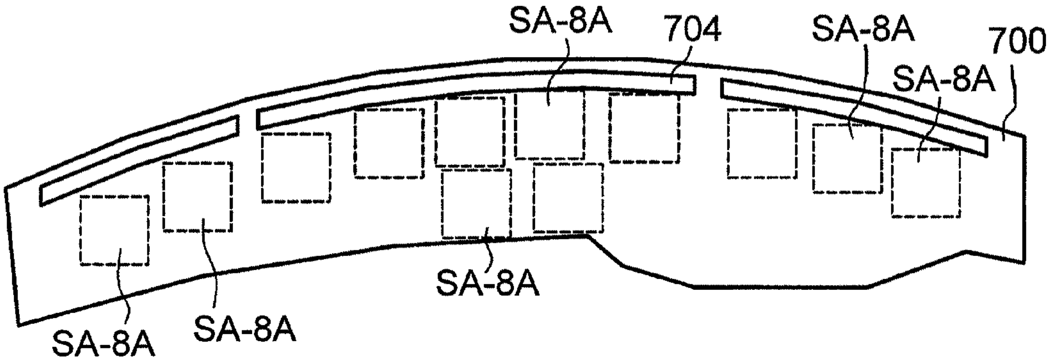
FIG. 26 is an illustration viewed in an I-direction in FIG. 25, which shows the arrangement of plural sound absorbers.

FIG. 26 is an illustration of the instrument panel 700 viewed in the I-direction in FIG. 25, which shows the arrangement of the sound absorbers SA_8A in the upper view. A plurality of sound absorbers SA_8A is disposed in a wide range of area on the upper side of the interior wall of the instrument panel 700. In addition, the sound absorbers SA_8A are disposed in proximity to the defrost duct 706 and the other portion of the interior wall of the instrument panel 700.

Figure 27:
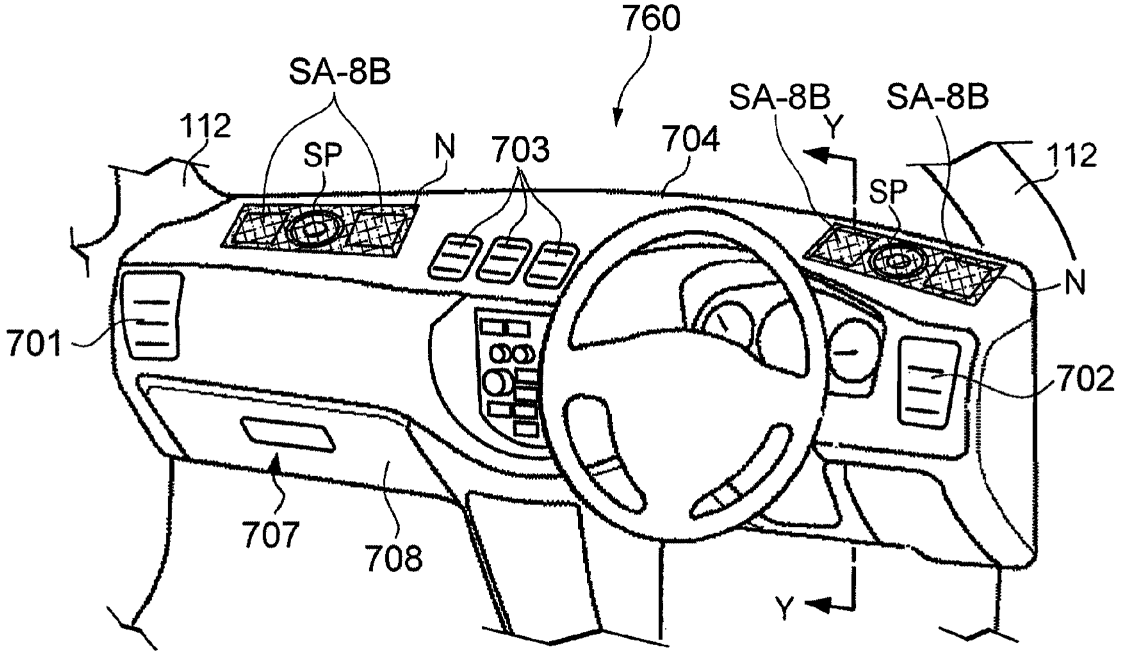
FIG. 27 is a perspective view showing the external appearance of an instrument panel adopting a sound absorber according to a modified example of the eighth embodiment.
Figure 28:
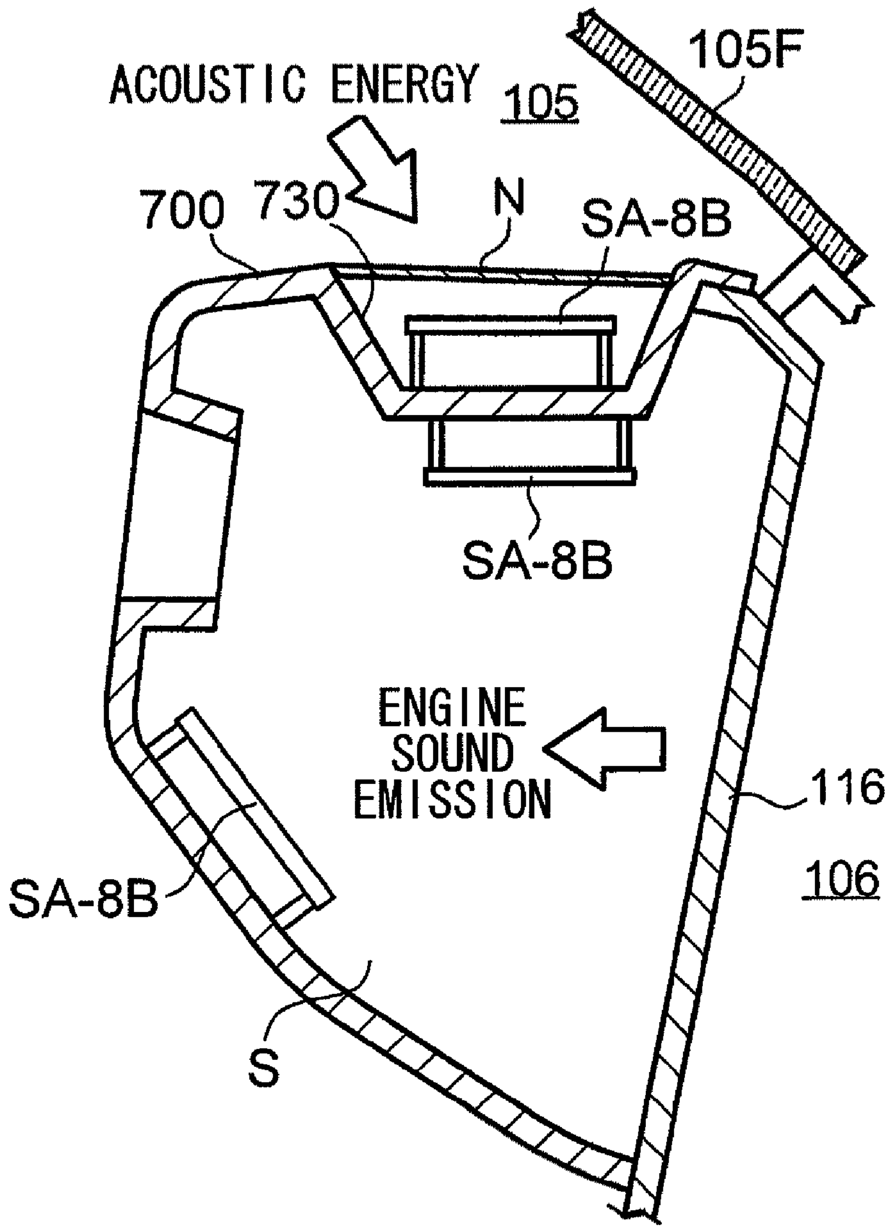
FIG. 28 is a sectional view taken along line Y-Y in FIG. 27, which shows the arrangement of plural sound absorbers according to the modified example.

FIG. 27 is a perspective view showing the external appearance of the instrument panel 700 adopting sound absorbers SA_8B according to a variation of the eighth embodiment. A speaker SP together with two sound absorbers SA_8B are disposed on each of the right and left sides of the upper surface of the instrument panel 700. FIG. 28 is a cross-sectional view taken along line Y-Y in FIG. 27, which shows the internal structure of the instrument panel 700. A recess 730 is formed in each of the right and left sides of the upper surface of the instrument panel 700. One speaker SP and two sound absorbers SA_8B are disposed inside the recess 730, the opening of which is covered with a net N. The other sound absorbers SA_8B are disposed on the interior wall of the instrument panel 700 as well. In this constitution, the sound absorbers SA_8B consume acoustic energy propagated from the compartment 105 and energy of an engine sound emitted from the engine room 106 via the engine partition 116, thus achieving sound absorption.

In the above, the sound absorbers SA_8B are not necessarily disposed in the recess 730 holding the speaker SP; hence, they can be disposed in another space for arranging instruments and the like. The sound absorbers SA_8B are not necessarily covered with the net N; hence, they can be rearranged to communicate with the compartment 105 via a grill, mesh, and slits.

9. Ninth Embodiment

A ninth embodiment is characterized in that a three-dimensional sound absorbing structure is formed by combining a plurality of sound absorbers.

Specifically, a plate-vibration sound absorbing structure 800 according to the ninth embodiment includes a plurality of sound absorbers 820 in a housing 810 thereof.

Figure 29A:
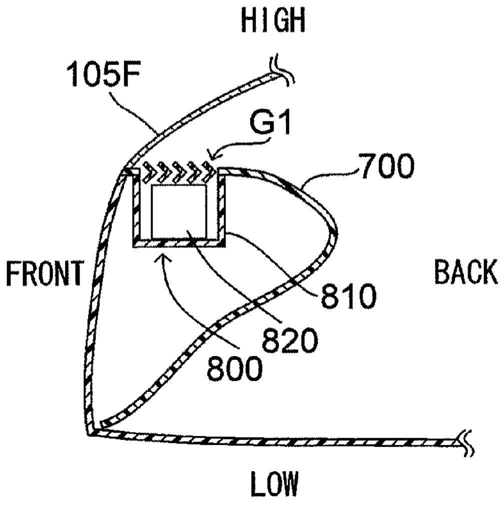
FIG. 29A is a sectional view showing an example in which a plate-vibration sound absorbing structure according to a ninth embodiment of the present invention is installed inside the instrument panel.

Examples for attaching the present embodiment to various positions of the vehicle 100 will be described with reference to FIGS. 29A to 29E. FIG. 29A is a cross-sectional view of the instrument panel 700 equipped with the plate-vibration sound absorbing structure 800, and FIG. 29B is an upper plan view of the instrument panel 700.

Figure 29B:
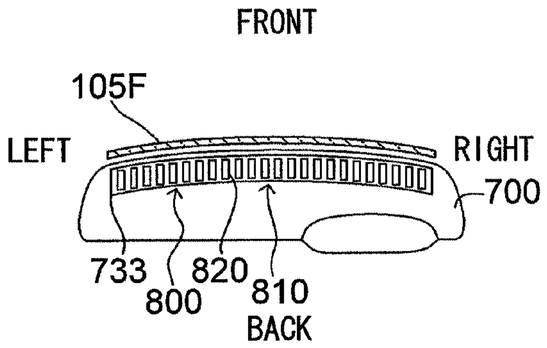
FIG. 29B is a plan view of the upper side of the instrument panel shown in FIG. 29A.

As shown in FIGS. 29A and 29B, the housing 810 of the plate-vibration sound absorbing structure 800 is attached to a lower position of the instrument panel 700, wherein an elongated hole 733 which is elongated in the longitudinal direction is formed in the instrument panel 700 in proximity to the boundary of a front glass 105F and is covered with a grill G1. The housing 810 is curved in the longitudinal direction, and the opening thereof has substantially the same dimensions as the elongated hole 733 of the instrument panel 700. That is, the plate-vibration sound absorbing structure 800 is attached to the lower position of the instrument panel 700 in such a way that the opening of the housing 810 is positioned opposite to the elongated hole 733 of the instrument panel 700.

A plurality of sound absorbers 820 is disposed in the housing 810 such that the vibration surfaces thereof are perpendicular to a virtual opening plane encompassed by the opening edge of the housing 810. Specifically, the vibration surfaces of the sound absorbers 820 are disposed in parallel with the front-back direction of the vehicle 100, wherein the sound absorbers 820 are disposed in the housing 810 along the elongated hole 733 of the instrument panel 700 in the right-left direction of the vehicle 100.

Figure 29C:
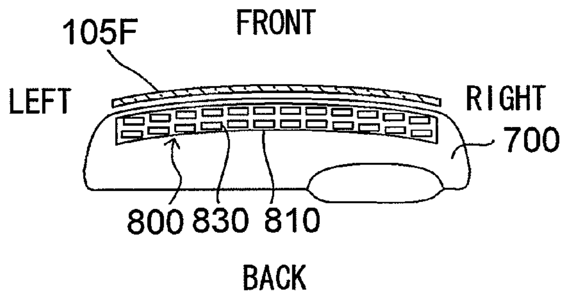
FIG. 29C is a plan view showing an example in which plural sound absorbers forming the plate-vibration sound absorbing structure installed inside the instrument panel are aligned in parallel with left-right directions of a vehicle.

By arranging two or more sound absorbers 820 per unit area corresponding to the surface area of the sound absorber 820 in the housing 810, it is possible to achieve the plate-vibration sound absorbing structure 800 having a high sound absorption coefficient. It is preferable that the plate-vibration sound absorbing structure 800 of the present embodiment be disposed at a predetermined position at which sound pressure tends to increase in the vehicle 100. Since the sound absorbers 820 are disposed in the housing 810 such that the vibration surfaces thereof cross the opening plane of the housing 810, it is possible to appropriately change the directions of disposing the sound absorbers 820. In FIG. 29C, a plurality of sound absorbers 830 is disposed in the housing 810 of the plate-vibration sound absorbing structure 800 such that the vibration surfaces thereof are aligned in parallel with the left-right direction of the vehicle 100. Of course, it is possible to align the sound absorbers 820 and 830 such that their vibration surfaces are not perpendicular to the opening plane of the housing 810.

Figure 29D:
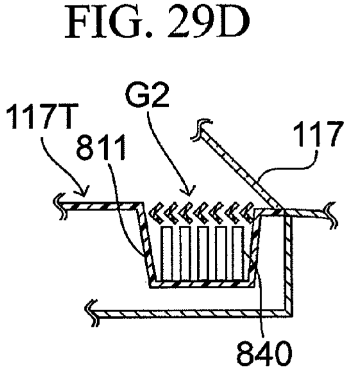
FIG. 29D is a sectional view showing an example in which the plate-vibration sound absorbing structure is installed in a tray beneath a rear glass of a vehicle.

FIG. 29D shows an example in which a tray 117T beneath a rear glass 117 of the vehicle 100 serves as a housing 811 of the plate-vibration sound absorbing structure 800. The opening of the housing 811 is covered with a grill G2. A plurality of sound absorbers 840 is disposed in the housing 811 so as to effectively reduce noise in the rear seat of the vehicle 100.

Figure 29E:
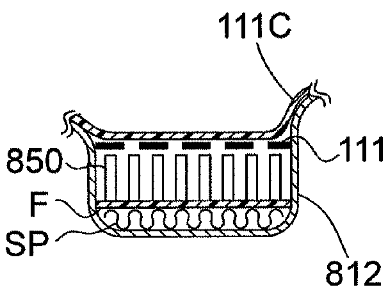
FIG. 29E is a sectional view showing an example in which the plate-vibration sound absorbing structure is installed in the lower portion of a floor of a vehicle.

FIG. 29E shows an example in which a housing 812 of the plate-vibration sound absorbing structure 800 is disposed beneath the floor 111 of the vehicle 100. The floor 111 is equipped with a perforated metal so as to achieve acoustic transmissivity, wherein a floor carpet 111C is attached to the upper surface of the floor 111. The housing 812 is attached beneath the floor 111 such that the opening thereof is directed to the floor 111. In order to increase a sound absorption effect, a felt F is adhered to the bottom of the housing 812 and is covered with a sound insulation layer SP composed of a rubber sheet, so that a plurality of sound absorbers 850 is aligned on the sound insulation layer SP. In this constitution, it is possible to effectively reduce road noise entering into the compartment 105 from below the vehicle 100.

Figure 30A:
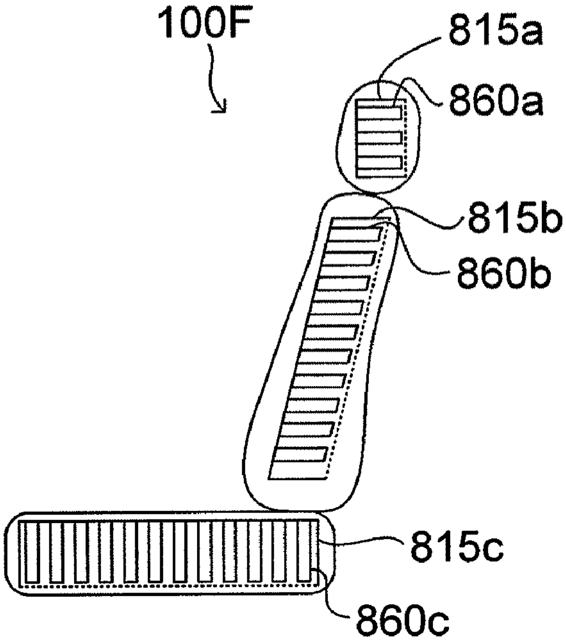
FIG. 30A is a sectional view showing an example in which a plate-vibration sound absorbing structure composed of plural housings each aligning plural sound absorbers is installed inside a front seat of a vehicle.

FIG. 30A shows that a plate-vibration sound absorbing structure 800A having a plurality of housings 815*a*, 815*b*, and 815*c* is installed in a front seat 100F of the vehicle 100. Grill-shaped openings (drawn with dotted lines) are formed in the front seat 100F in proximity to the openings of the housings 815*a*, 815*b*, and 815*c*. A plurality of sound absorbers 860*a* is disposed in the housing 815*a*; a plurality of sound absorbers 860*b* is disposed in the housing 815*b*; and a plurality of sound absorbers 860*c* is disposed in the housing 815*c*. In this constitution, it is possible to absorb noise in the compartment 105, and it is possible to reduce acoustic energy transmitted to a human body from the front seat 100F.

Figure 30B:
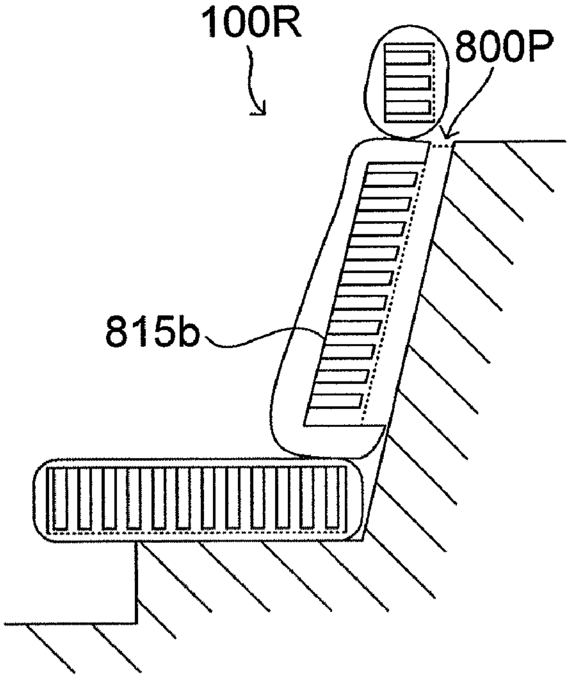
FIG. 30B is a sectional view showing an example in which a plate-vibration sound absorbing structure composed of plural housings each aligning plural sound absorbers is installed inside a rear seat of a vehicle.

FIG. 30B shows an example in which sound waves such as noise are guided to a plate-vibration sound absorbing structure 800B installed in a rear seat 100R so as to effectively absorb sound. The overall constitution of the plate-vibration sound absorbing structure 800B is roughly identical to that of the plate-vibration sound absorbing structure 800A. An opening 800P is formed in the upper section of a space formed in the backside of a back support of the rear seat 100R, wherein the space communicates with the opening of the housing 815*b*. When sound waves enter into the backside of the rear seat 100R via the opening 800P in proximity to the rear seat 100R, it is possible to effectively suppress them.

Next, variations of the present embodiment will be described with respect to the alignment of sound absorbers 920 in a housing 910 of a plate-vibration sound absorbing structure 900 in conjunction with FIGS. 31A to 31E.

Figure 31A:
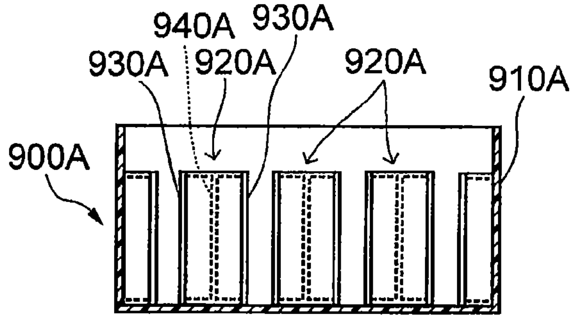
FIG. 31A is a sectional view showing a plate-vibration sound absorbing structure according to a first modified example of the ninth embodiment.

FIG. 31A shows that a plurality of sound absorbers 920A is disposed in a housing 910A of a plate-vibration sound absorbing structure 900A. The sound absorbers 920A have support members 940A, each of which has a hexahedron shape whose two opposite sides are removed so as to leave four sides, wherein a single surface is formed perpendicular to the center of each of the four sides. When the support member 940A is subjected to cutting in a direction which is perpendicular to one pair of opposite sides within the four sides and in a direction which is parallel to the other pair of opposite sides, the cross-sectional shape thereof is roughly H-shaped. Due to the above constitution of the support member 940A, openings are formed on opposite ends of each side, wherein the sound absorber 920A is assembled in such a way that each opening joins each vibration member 930A.

An opening is formed on one side of the housing 910A. The vibration surfaces of the vibration members 930A are aligned to cross the virtual opening plane encompassed by the edge of the opening of the housing 910A. This makes it possible to easily adjust the number of the sound absorbers 920A disposed in the housing 910A of the plate-vibration sound absorbing structure 900A, thus improving the sound absorption coefficient.

Figure 31B:
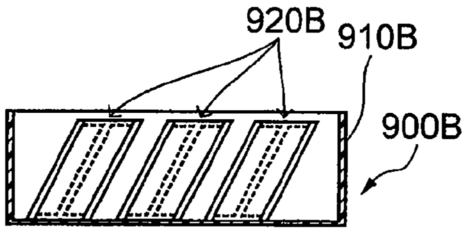
FIG. 31B is a sectional view showing a plate-vibration sound absorbing structure according to a second modified example of the ninth embodiment.
Figure 31C:
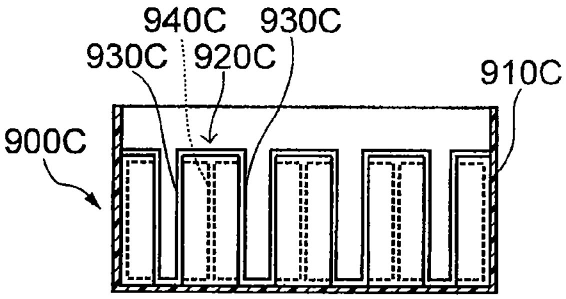
FIG. 31C is a sectional view showing a plate-vibration sound absorbing structure according to a third modified example of the ninth embodiment.
Figure 31D:
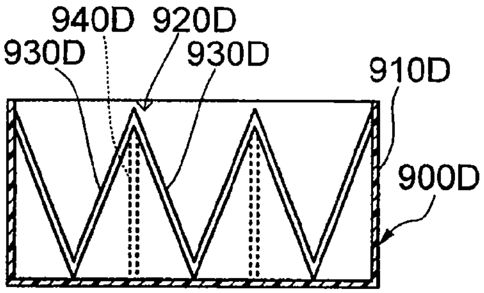
FIG. 31D is a sectional view showing a plate-vibration sound absorbing structure according to a fourth modified example of the ninth embodiment.

It is possible to incline the positions of the sound absorbers 920A linearly aligned in the plate-vibration sound absorbing structure 900A shown in FIG. 31A. FIG. 31B shows a plate-vibration sound absorbing structure 900B enclosed in a housing 910B in which a plurality of sound absorbers 920B is disposed and inclined in position. This makes it possible to reduce the height without reducing the overall area of the vibration surfaces of the sound absorbers 920B. Thus, it is possible to achieve the plate-vibration sound absorbing structure 900B having a small height and a high sound absorption coefficient.

A plurality of vibration members can be formed using one sheet. Similar to the plate-vibration sound absorbing structure 900A shown in FIG. 31A, a plurality of support members 940C is disposed in a housing 900C of a plate-vibration sound absorbing structure 900C, wherein the support members 940C join together while closing openings thereof by bending one sheet. This produces a plate-shaped structure which is limited in position by the openings of the support members 940C and which is used to form vibration members 930C so as to absorb sound. This constitution allows one sheet to form a plurality of sound absorbers 920C equipped with a plurality of vibration members 930C; hence, it is possible to easily produce the plate-vibration sound absorbing structure 900C.

It is possible to provide different shapes to the support members 940A of the sound absorbers 920A shown in FIG. 31A. In a plate-vibration sound absorbing structure 900D shown in FIG. 31D, plate-shaped support members 940D are attached to the bottom of a housing 910D so as to direct toward the upper opening. A bent sheet is attached to the ends of the support members 940D and the bottom of the housing 910D, thus forming vibration members 930D supported by the support members 940D. This constitution allows one sheet to form a plurality of sound absorbers 920D equipped with a plurality of vibration members 930D inside the housing 910D; hence, it is possible to easily produce the plate-vibration sound absorbing structure 900D.

Figure 31E:
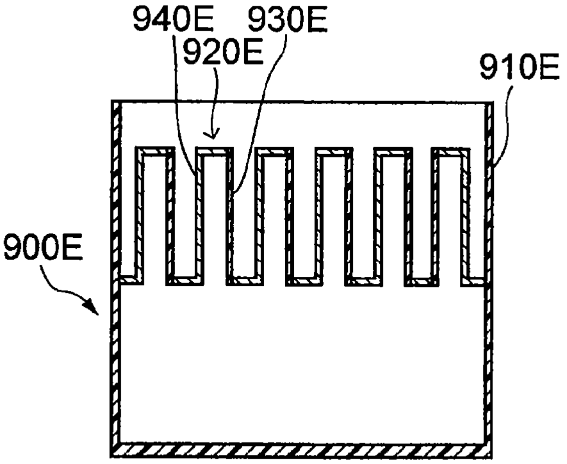
FIG. 31E is a sectional view showing a plate-vibration sound absorbing structure according to a fifth modified example of the ninth embodiment.

Since the support member of the sound absorber is used to support the vibration member and to form an air layer on one side thereof, it is unnecessary to form the air layer in the surrounding area of the support member. FIG. 31E shows a plate-vibration sound absorbing structure 900E in which sound absorbers 920E are subjected to cutting in a direction perpendicular to the each side and the bottom of a housing 910E.

FIG. 31 E shows that a pair of opposite sides of the sound absorber 920E is positioned opposite to a support member 940E and that in one side within the opposite sides, the support member 940E is partially cut out in the range from the position which comes in contact with a plane perpendicular to the center of each side to one vibration member 930E, while in the other side, the support member 940E is partially cut out in the range from the position which comes in contact with the plane to the other vibration member 930E. That is, the sound absorber 920E whose support member 940E is partially cut out is integrally unified with the vibration member 930E and is fixed to the center of the side wall of the housing 910E. In the plate-vibration sound absorbing structure 900E of FIG. 31E, the sound absorber 920E is constituted of the vibration member 930E and the support member 940E.

In FIG. 31E, the support member 940E is fixed to the center of the side wall of the housing 910E so that an air layer is formed between the vibration member 930E and the support member 940E while a relatively large air layer is also formed beneath the vibration member 930E and the support member 940E (i.e. above the bottom of the housing 910E). This constitution allows the total volume of the air layers to be easily adjusted, thus easily adjusting the frequency band subjected to sound absorption.

The shape of the vibration member of the sound absorber in the plate-vibration sound absorbing structure is not necessarily limited to the square shape, which can be changed to various shapes such as polygonal shapes, circular shapes, and elliptic shapes. In addition, it is possible to control the frequency band of sound absorption by additionally forming holes in the vibration member and the support member.

Lastly, the present invention is not necessarily limited to the above embodiments and variations, which can be further modified within the scope of the invention as defined in the appended claims.

What is claimed is:

1. A sound absorbing structure comprising:

a housing having a hollow portion and an opening; and a vibration member composed of a board or a diaphragm, wherein the opening of the housing is covered with the vibration member, wherein a peak frequency of sound absorption, which occurs when a fundamental frequency of an elastic vibration of the vibration member cooperates with a spring component of an air layer formed in the hollow portion of the housing, is lower than a resonance frequency of a spring-mass system based on a mass of the vibration member and the spring component of the air layer of the hollow portion of the housing, and wherein the fundamental frequency of the elastic vibration of the vibration member falls within a range between 5% and 65% of the resonance frequency of the spring-mass system based on the mass of the vibration member and the spring component of the air layer of the hollow portion of the housing.

2. The sound absorbing structure according to claim 1, wherein the vibration member is fixed to the housing.

3. The sound absorbing structure according to claim 2, wherein the hollow portion of the housing has a rectangular parallelepiped shape so that the opening has a square shape, and wherein a first-side length "a" [m] of the square shape, a Young's modulus "E" [N/m$^2$] of the vibration member, a thickness "t" [m] of the vibration member, a Poisson's ratio "σ" of the vibration member, and a thickness "L" [m] of the hollow portion of the housing are used to establish an inequality of:

$$3 < \left(\frac{1}{a}\right)^4 \frac{Et^3 L}{1-\sigma^2} < 550.$$

4. The sound absorbing structure according to claim 2, wherein the hollow portion of the housing has a rectangular parallelepiped shape so that the opening has a rectangular shape, and wherein a first-side length "a" [m] of the rectangular shape, a second-side length "b" [m] perpendicular to the first-side length "a" in the rectangular shape, a Young's modulus "E" [N/m2] of the vibration member, a thickness "t" [m] of the vibration member, a Poisson's ratio "σ" of the vibration member, and a thickness "L" [m] of the hollow portion of the housing are used to establish an inequality of:

$$12 < \left[\left(\frac{1}{a}\right)^2 + \left(\frac{1}{b}\right)^2\right]^2 \left[\frac{Et^3 L}{1-\sigma^2}\right] < 2100.$$

5. The sound absorbing structure according to claim 2, wherein the hollow portion of the housing has a cylindrical shape so that the opening has a circular shape, and wherein a radius R [m] of the opening, a Young's modulus "E" [N/m2] of the vibration member, a thickness "t" [m] of the vibration member, a Poisson's ratio "aσ of the vibration member, and a thickness "L" [m] of the hollow portion of the housing are used to establish an inequality of:

$$40 < \left[\left(\frac{1}{R}\right)^2\right]^2 \frac{Et^3 L}{1-\sigma^2} < 6850.$$

6. The sound absorbing structure according to claim 1, wherein the vibration member is simply supported by the housing.

7. The sound absorbing structure according to claim 6, wherein the hollow portion of the housing has a rectangular parallelepiped shape so that the opening has a square shape, and wherein a first-side length "a" [m] of the square shape, a Young's modulus "E" [N/m2] of the vibration member, a thickness "t" [m] of the vibration member, a Poisson's ratio "σ" of the vibration member, and a thickness "L" [m] of the hollow portion of the housing are used to establish an inequality of:

$$10 < \left(\frac{1}{a}\right)^4 \frac{Et^3 L}{1-\sigma^2} < 1820.$$

8. The sound absorbing structure according to claim 6, wherein the hollow portion of the housing has a rectangular parallelepiped shape so that the opening has a rectangular shape, and wherein a first-side length "a" [m] of the rectangular shape, a second-side length "b" [m] perpendicular to the first-side length "a" in the rectangular shape, a Young's modulus "E" [N/m2] of the vibration member, a thickness "t" [m] of the vibration member, a Poisson's ratio "σ" of the vibration member, and a thickness "L" [m] of the hollow portion of the housing are used to establish an inequality of:

$$40 < \left[\left(\frac{1}{a}\right)^2 + \left(\frac{1}{b}\right)^2\right]^2 \left[\frac{Et^3 L}{1-\sigma^2}\right] < 7300.$$

9. The sound absorbing structure according to claim 6, wherein the hollow portion of the housing has a cylindrical shape so that the opening has a circular shape, and wherein a radius R [m] of the opening, a Young's modulus "E" [N/m2] of the vibration member, a thickness "t" [m] of the vibration member, a Poisson's ratio "σ" of the vibration member, and a thickness "L" [m] of the hollow portion of the housing are used to establish an inequality of:

$$161 < \left[\left(\frac{1}{R}\right)^2\right]^2 \frac{Et^3 L}{1-\sigma^2} < 27700.$$

10. A sound chamber having the sound absorbing structure according to claim 1.

* * * * *